US008789103B2

(12) United States Patent
Onogi et al.

(10) Patent No.: US 8,789,103 B2
(45) Date of Patent: Jul. 22, 2014

(54) DISPLAY DEVICE AND DISPLAY METHOD

(75) Inventors: Ken Onogi, Tokyo (JP); Koichi Tashiro, Tokyo (JP); Naoya Okamoto, Tokyo (JP)

(73) Assignee: Sony Corporation (JP)

( * ) Notice: Subject to any disclaimer, the term of this patent is extended or adjusted under 35 U.S.C. 154(b) by 226 days.

(21) Appl. No.: 12/804,934

(22) Filed: Aug. 2, 2010

(65) Prior Publication Data

US 2011/0043696 A1 Feb. 24, 2011

(30) Foreign Application Priority Data

Aug. 18, 2009 (JP) ................................ P2009-189481

(51) Int. Cl.
*H04N 5/445* (2011.01)
*H04N 21/482* (2011.01)
*H04N 21/431* (2011.01)
*H04N 21/462* (2011.01)
*G06F 9/44* (2006.01)
*G11B 27/34* (2006.01)

(52) U.S. Cl.
CPC ......... *H04N 21/482* (2013.01); *H04N 21/4828* (2013.01); *H04N 21/4316* (2013.01); *H04N 21/4622* (2013.01); *G06F 9/4443* (2013.01); *H04N 5/44543* (2013.01); *G11B 27/34* (2013.01)
USPC ................................ 725/43; 725/44; 705/716

(58) Field of Classification Search
CPC ............ H04N 21/482; H04N 21/4828; H04N 21/4316; H04N 21/4622; H04N 5/44543; G06F 9/4443; G11B 27/34
USPC ............... 725/39–61; 705/700, 716, 718, 719
See application file for complete search history.

(56) References Cited

U.S. PATENT DOCUMENTS

| 5,719,637 | A | | 2/1998 | Ohkura et al. | |
|---|---|---|---|---|---|
| 6,005,562 | A | * | 12/1999 | Shiga et al. | 715/721 |
| 6,522,342 | B1 | * | 2/2003 | Gagnon et al. | 715/716 |
| 2002/0188746 | A1 | * | 12/2002 | Drosset et al. | 709/231 |
| 2003/0117445 | A1 | * | 6/2003 | Hendricks et al. | 345/810 |
| 2008/0129864 | A1 | | 6/2008 | Stone et al. | |
| 2009/0119614 | A1 | | 5/2009 | Tienvieri et al. | |

(Continued)

FOREIGN PATENT DOCUMENTS

| EP | 1246465 A2 | 10/2002 |
|---|---|---|
| JP | 08-140007 A | 5/1996 |

(Continued)

OTHER PUBLICATIONS

European Search Report EP 10172489, dated Nov. 30, 2010.

(Continued)

*Primary Examiner* — Farzana Hossain
(74) *Attorney, Agent, or Firm* — Lerner, David, Littenberg, Krumholz & Mentlik, LLP

(57) ABSTRACT

Provided is a display device including a display mode controller for controlling a screen transition to a whole screen display mode for displaying an image in an entire screen of a display section, a multiple content display mode for displaying, on the screen, a plurality of thumbnail images related to contents, or a panel display mode for displaying, on the screen, a panel on which information related to the contents is displayed, and a panel shape determination section for determining a shape of the panel based on the contents to be displayed on the panel.

1 Claim, 22 Drawing Sheets

(56) References Cited

U.S. PATENT DOCUMENTS

| | | |
|---|---|---|
| 2009/0164944 A1 | 6/2009 | Webster et al. |
| 2009/0165046 A1* | 6/2009 | Stallings et al. ............... 725/39 |
| 2010/0153999 A1* | 6/2010 | Yates .............................. 725/39 |
| 2011/0043697 A1* | 2/2011 | Onogi et al. ................... 348/564 |
| 2011/0047512 A1* | 2/2011 | Onogi et al. ................... 715/836 |
| 2011/0047513 A1* | 2/2011 | Onogi et al. ................... 715/838 |
| 2011/0047573 A1* | 2/2011 | Onogi et al. .................... 725/41 |
| 2011/0072468 A1* | 3/2011 | Kim et al. ....................... 725/56 |
| 2011/0296467 A1* | 12/2011 | Vaysman et al. ................ 725/61 |

FOREIGN PATENT DOCUMENTS

| | | |
|---|---|---|
| JP | 08-149384 A | 6/1996 |
| JP | 09-037179 A | 2/1997 |
| JP | 11-119755 A | 4/1999 |
| JP | 2006339693 | 12/2006 |
| JP | 2008538629 A | 10/2008 |
| JP | 2009-140453 A | 6/2009 |

OTHER PUBLICATIONS

Communication from EP Application No. 10172489.6, dated Mar. 1, 2012.

Office Action from Japanese Application No. 2009-189481, dated Apr. 30, 2013.

* cited by examiner

DISPLAY DEVICE AND DISPLAY METHOD

CROSS-REFERENCE TO RELATED APPLICATION

The present application claims priority from Japanese Patent Application No. JP 2009-189481 filed in the Japanese Patent Office on Aug. 18, 2009, the entire content of which is incorporated herein by reference.

BACKGROUND OF THE INVENTION

1. Field of the Invention

The present invention relates to a display device and a display method.

2. Description of the Related Art

In recent years, television devices (display devices) can receive a television broadcast signal which is digitalized and transmitted, and can also be connected to a cable television system, various external devices, and the Internet. As a result, the television devices can receive a large amount of video contents, use image providing service from a service provider, and access related information. Contents that can be used include a moving image, a still image, various data information, metadata, widget, and the like.

Therefore, in an operation of the television device, a selection of many video broadcast channels and a selection of many contents are required, and a system that can easily select a channel and content is desired.

In Japanese Patent Application Laid-Open No. 08-140007 and Japanese Patent Application Laid-Open No. 08-149384, an image of a receiving broadcast channel is displayed as a parent screen. A plurality of other broadcast channels that have been already received are sequentially searched, and acquired images are categorized and displayed in a single horizontal row in a lower portion of the screen as child screens along with the parent screen. Furthermore, there is a modification step in which display data is sequentially modified.

However, in Japanese Patent Application Laid-Open No. 08-140007 and Japanese Patent Application Laid-Open No. 08-149384, the number of screens that can be displayed is limited, and an image display of the broadcast channel is mainly performed. Differently from Japanese Patent Application Laid-Open No. 08-140007, in Japanese Patent Application Laid-Open No. 08-149384, a display size of the child screen decreases as the child screen approaches the edge of the screen, and it is considered so that contents more than in Japanese Patent Application Laid-Open No. 08-140007 can be displayed.

In Japanese Patent Application Laid-Open No. 11-119755, the screen is divided into a plurality of small screens, and priorities are set for the plurality of small screens. Also, in Japanese Patent Application Laid-Open No. 11-119755, a display position is moved by a scroll means. Japanese Patent Application Laid-Open No. 9-37179 determines an existence of related information using an electronic program guide to display the related information as well as a pointer on a second display section.

SUMMARY OF THE INVENTION

However, in the related art as described above, a selection of the broadcast channel is mainly performed. Therefore, in an environment in which a cable television broadcast and a digital broadcast can be received and video data or the like is received by using the Internet as in recent years, types of handled video data and the number of broadcast channels are different from the related art. The number and types of usable contents increase when including external devices that can be connected to the television device.

Therefore, after handling usable video data that is expected to increase more and more from now on, a desired video data should be easily selected without interrupting a main image that a user is currently viewing.

As in Japanese Patent Application Laid-Open No. 08-140007, Japanese Patent Application Laid-Open No. 08-149384, and Japanese Patent Application Laid-Open No. 11-119755, by simply arranging and displaying contents that can be received in the lower portion or peripheral portion of the screen that displays a currently broadcast program, only a stereotypical selection method can be employed. Therefore, when displaying and selecting many contents having a hierarchical structure, there is a limit in the display area and the number of contents to be displayed, and an easy display method and selection method are not realized.

In light of the foregoing, it is desirable to provide a novel and improved display device and display method, which are capable of improving an operability of a selectable plurality of pieces of information without interrupting a screen of contents that a user is currently viewing.

According to an embodiment of the present invention, there is provided a display device including a display mode controller for controlling a screen transition to a whole screen display mode for displaying an image in an entire screen of a display section, a multiple content display mode for displaying, on the screen, a plurality of thumbnail images related to contents, or a panel display mode for displaying, on the screen, a panel on which information related to the contents is displayed, and a panel shape determination section for determining a shape of the panel based on the contents to be displayed on the panel.

The panel shape determination section may obtain information for determining the shape of the panel is obtained via a network.

The display device may further include a panel information display section for displaying, on the screen, related information which relates to the contents to be displayed in the panel in the panel display mode.

The display device may further include a panel information display section for displaying, on the screen, related information which relates to the contents to be displayed in the panel in the panel display mode, and an image display section for displaying the image on a part of the screen of the display section in the panel display mode. The panel information display section may display the related information on the screen based on a relationship between the contents to be displayed on the panel and the image to be displayed on the display section.

The display device may further include an image display section for displaying the image on a part of the screen of the display section in the panel display mode, and a superposed display section for displaying, on a part on which the image is displayed, the contents displayed on the panel by overlapping.

According to another embodiment of the present invention, there is provided a display method including the steps of controlling, by a display mode controller, a screen transition to a whole screen display mode for displaying an image in an entire screen of a display section, a multiple content display mode for displaying, on the screen, a plurality of thumbnail images related to contents, or a panel display mode for displaying, on the screen, a panel on which information related to the contents is displayed, and determining, by a panel shape determination section, a shape of the panel based on the contents to be displayed on the panel.

According to the embodiments of the present invention, an operability of a selectable plurality of pieces of information can be improved without interrupting a screen of contents that a user is currently viewing.

DETAILED DESCRIPTION OF THE EMBODIMENT

Figure 1:
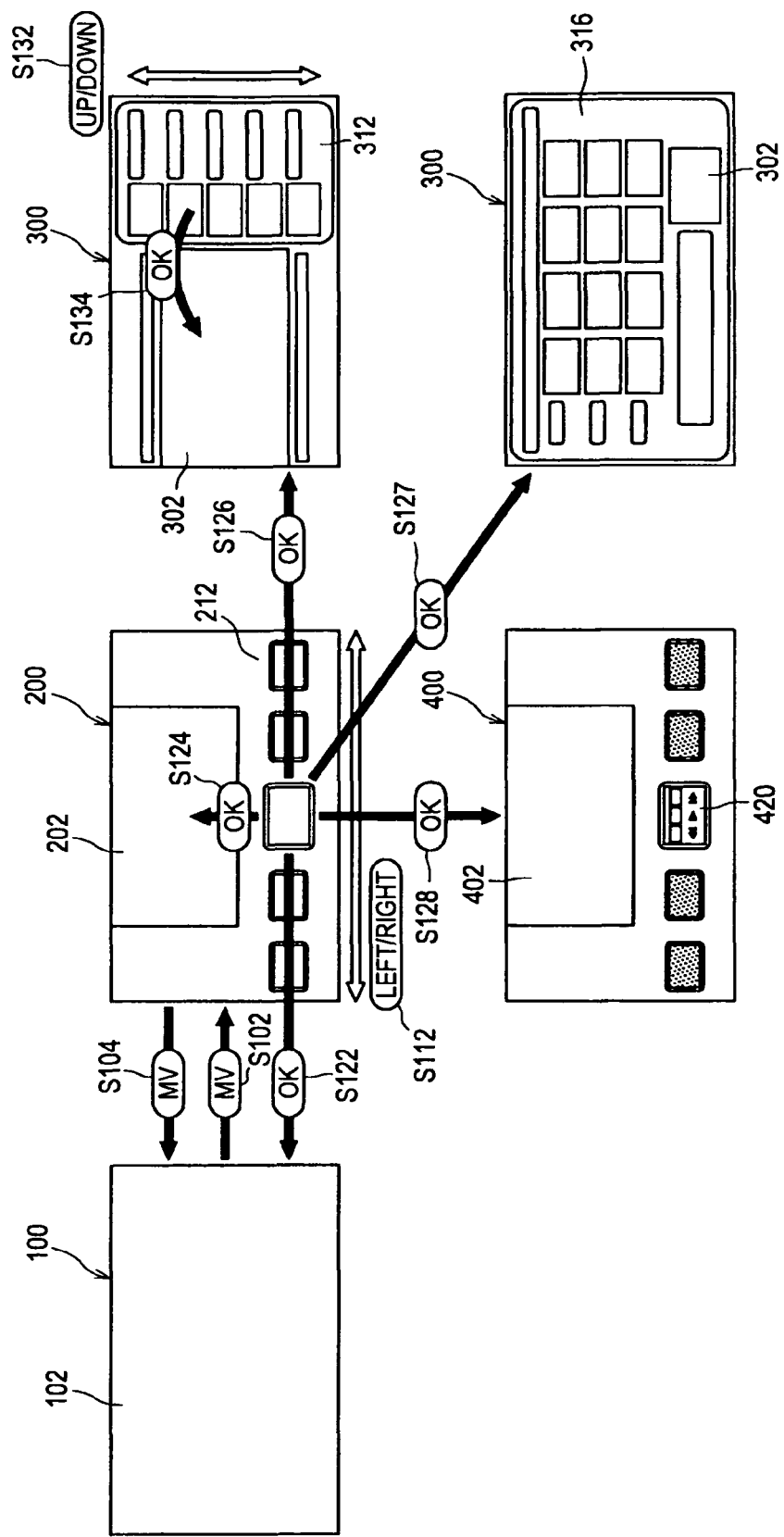
FIG. 1 is an illustration showing a plurality of display modes that can be displayed on a display device 10 according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Configuration of an Embodiment
2. Type of Display Mode
3. Details of Multiple Content Display Mode
4. Details of Panel Display Mode
5. Details of Recommendation Display Panel
6. Remote Control 600

<1. Configuration of an Embodiment>
[Configuration of Display Device]

Figure 2:
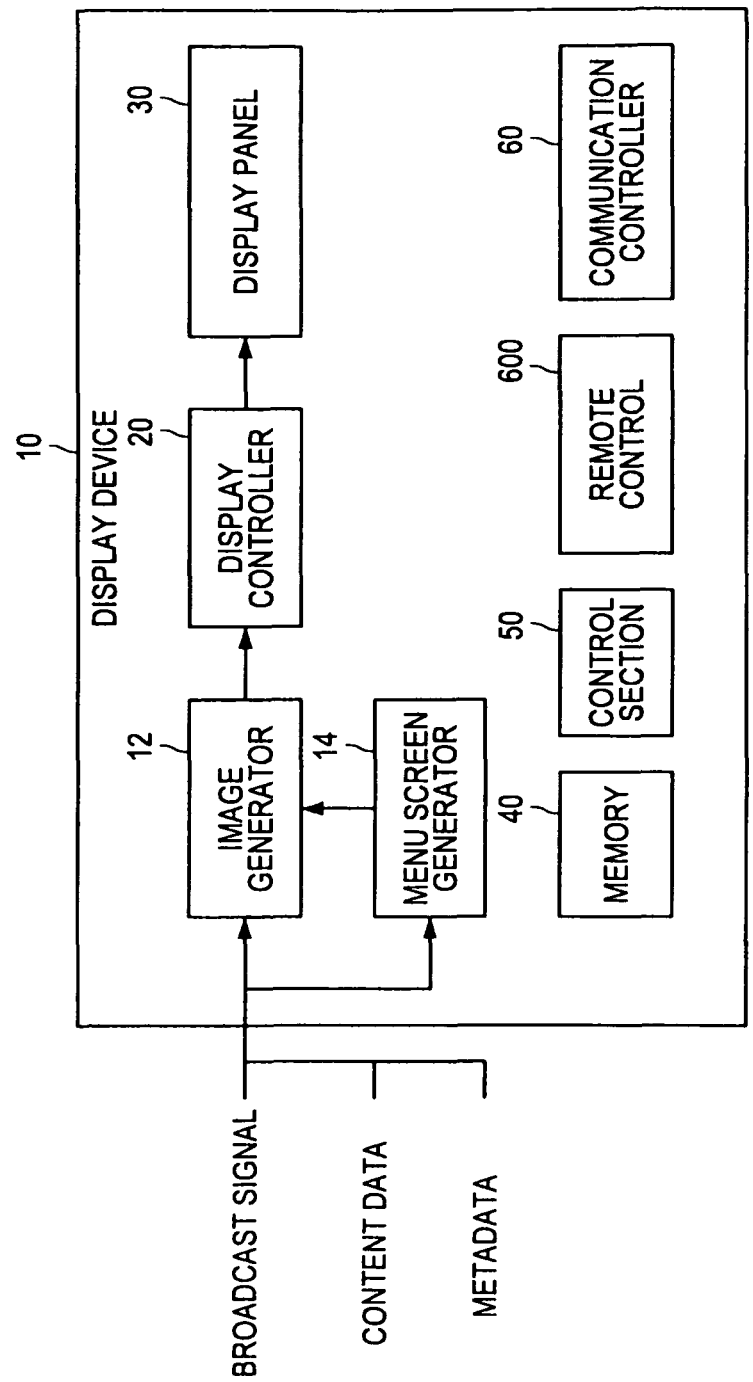
FIG. 2 is a block diagram showing a configuration of the display device 10 according to the embodiment.

First, a configuration of a display device 10 according to an embodiment of the present invention will be described with reference to FIG. 2. FIG. 2 is a block diagram showing a configuration of the display device 10 according to the embodiment.

The display device 10 includes, for example, an image generator 12, a menu screen generator 14, a display controller 20, a display panel 30, a memory 40, a control section 50, a remote control 600, a communication controller 60, and the like.

The display device 10 is, for example, a television device, and the display device 10 can receive broadcast programs by a broadcast wave, or receive image data and various data information via the Internet. The display device 10 is connected to an external device, and video data or the like is inputted into the display device 10.

The image generator 12 generates an image signal on the basis of data related to video to be displayed on a screen. The data related to video to be displayed on a screen includes broadcast data, movie data, video data, still image data, various data information, metadata, widget, and the like. The data related to video to be displayed on a screen also includes data related to GUI such as a menu screen. The menu screen includes a multiple content display mode, a panel display mode, a simultaneous viewing mode, and the like.

The menu screen generator 14 generates an image signal related to menu to be displayed on the screen on the basis of the data related to video to be displayed on the screen. The menu screen generator 14 transmits the generated image signal related to menu to the image generator 12. The image generator 12 transmits an image signal in which the image signal based on the data related to video and the image signal related to menu are combined together to the display controller 20.

The display controller 20 drives the display panel on the basis of the signal generated in the image generator 12.

The display panel 30 displays video on the basis of a drive signal or the like from the image generator 12. The display panel 30 is a liquid crystal display panel, a plasma display panel, an organic EL display panel, or the like.

The memory 40 holds data related to video, data related to menu, a program executed by the control section 50, and the like.

The control section 50 is, for example, a CPU, and the control section 50 causes various functional blocks provided in the display device 10 to operate, and performs various calculation operations.

The remote control 600 receives an operation by a user and outputs an operation signal. Processing in the display device 10 is started or stopped on the basis of the operation signal. An operation on the GUI displayed on the screen can be realized via the remote control 600.

The communication controller 60, for example, receives a broadcast signal, and is connected to a video recording and reproducing device or the like to receive a video signal. Further, the communication controller 60 is connected to the Internet, and transmits and receives information such as a video signal.

[Configuration of Remote Control]

Figure 22:
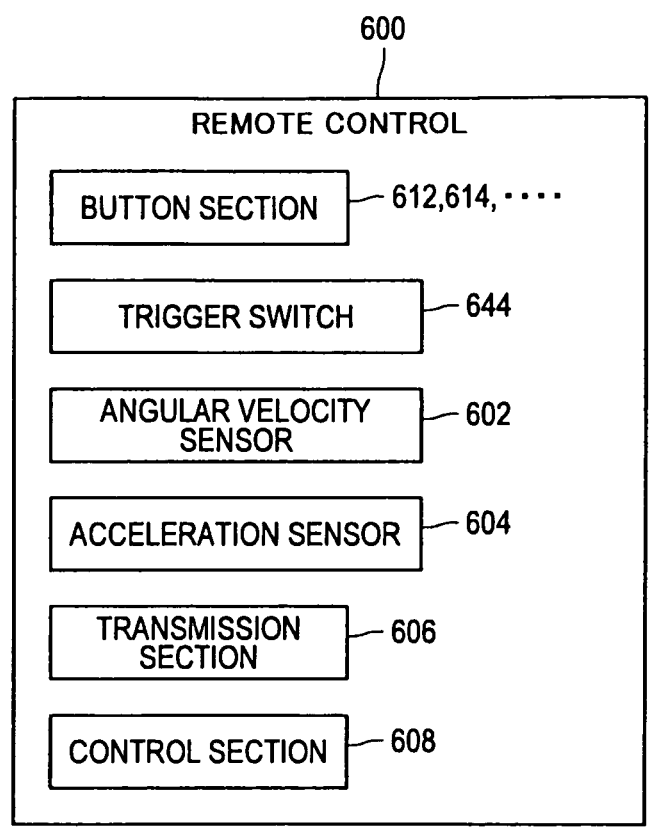
FIG. 22 is a block diagram showing a configuration of a remote control 600 according to the embodiment.

Next, a configuration of the remote control 600 according to an embodiment of the present invention will be described with reference to FIG. 22. FIG. 22 is a block diagram showing the configuration of the remote control 600 according to the embodiment.

The remote control 600 includes, for example, a button section 612, 614, and so on, a trigger switch 644, an angular velocity sensor 602, an acceleration sensor 604, a transmission section 606, a control section 608, and the like.

The button section is a collective name of a plurality of buttons provided on the remote control 600 that will be described with reference to FIG. 23. When a button in the button section is pressed, an operation signal corresponding to the button is generated.

The trigger switch 644 is provided on the front side or the back surface of the remote control 600, and detects an approach or a touch of a finger of a user. When the trigger switch 644 is on, information related to a position, a velocity, and an acceleration detected by the angular velocity sensor 602 and the acceleration sensor 604 is enabled, and the information related to a position, a velocity, and an acceleration is transmitted to a main body of the display device 10.

The angular velocity sensor 602 and the acceleration sensor 604 detect the position, the velocity, and the acceleration of the remote control 600.

The transmission section 606 transmits the generated operation signal and the detected information related to the position, the velocity, and the acceleration to the main body of the display device 10.

The control section 608 is, for example, a CPU, and the control section 608 causes various functional blocks provided in the remote control 600 to operate, and performs various calculation operations.

<2. Type of Display Mode>

A plurality of display modes includes, for example, the whole screen display mode, the multiple content display mode, the panel display mode, the simultaneous viewing mode, and the like, and each display mode displays one or more contents on the screen. A transition from the whole screen display mode to the multiple content display mode and vice versa, a transition from the multiple content display mode to the panel display mode, and a simultaneous display of the multiple content display mode and the panel display mode are possible.

[Whole Screen Display Mode]

Figure 17:
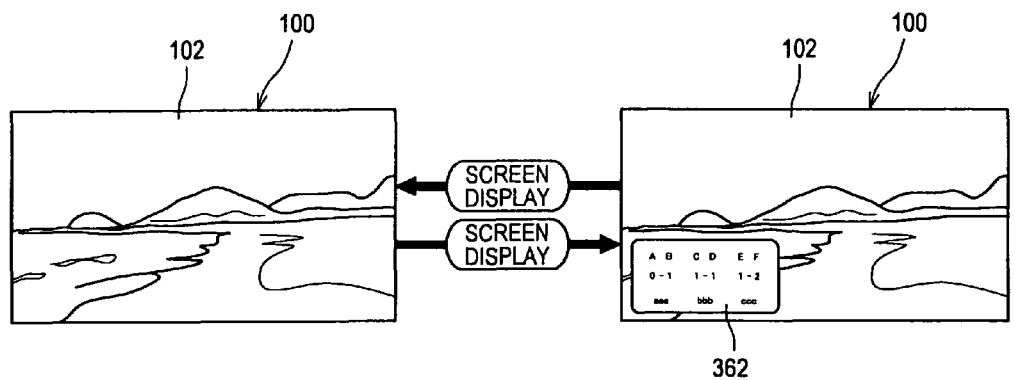
FIG. 17 is an illustration showing switching between visible and hidden of a widget image 362 in a screen 100 of a whole screen display mode.

The screen 100 shown in FIG. 1 and the screen 100 in FIG. 17 are screens displayed in the whole screen display mode. The screen 100 displayed in the whole screen display mode includes an image display area 102. In the image display area 102, a content reproduced by a reproducing device and a content broadcast by a broadcast wave are displayed.

[Multiple Content Display Mode]

Figure 4:
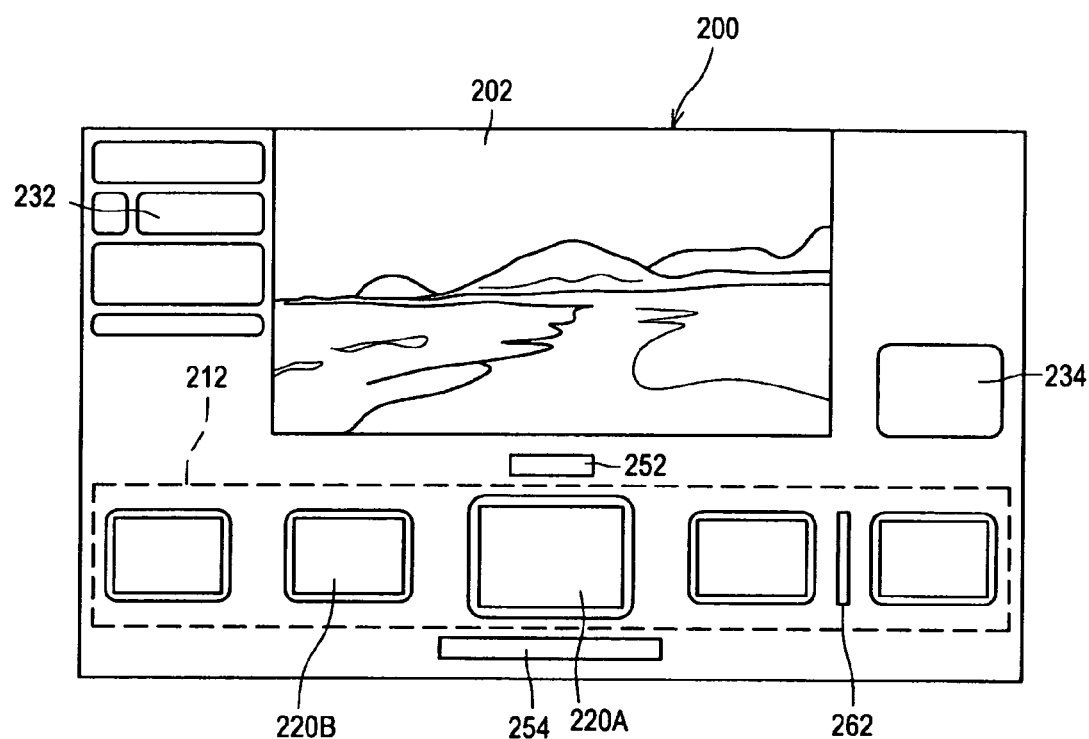
FIG. 4 is an illustration showing a screen 200 displayed in a multiple content display mode.

FIG. 4 is an illustration showing a screen 200 displayed in the multiple content display mode. The multiple content display mode displays contents belonging to various categories with a thumbnail image.

The screen 200 displayed in the multiple content display mode includes an image display area 202 and a thumbnail display area 212. In the image display area 202, a reproduced content and a broadcast content are displayed. In thumbnail display area 212, a plurality of thumbnail images 220A and 220B (hereinafter collectively referred to as "thumbnail image 220") are displayed. The thumbnail image 220 may be a representative image related to a content, an icon image representing meaning of an executable program or a content as a picture or a drawing, and the like.

The thumbnail image 220A is an image focused in the center of the thumbnail display area 212. For example, the frame of the thumbnail image 220A is enlarged compared with other thumbnail images 220B, and the thumbnail image 220A may be highlighted.

The thumbnail images 220B are images other than the thumbnail image 220A in the thumbnail display area 212. A plurality of thumbnail images 220B are displayed, so that it is possible to notice a user of candidates of selectable thumbnail images 220 in the thumbnail display area 212 in advance.

A category name 252 is displayed above the thumbnail image 220A, and a content title 254 is displayed below the thumbnail image 220A. The category name 252 is a name of category to which a content related to the thumbnail image 220A belongs. The content title 254 is a title of the content related to the thumbnail image 220A.

Figure 6:
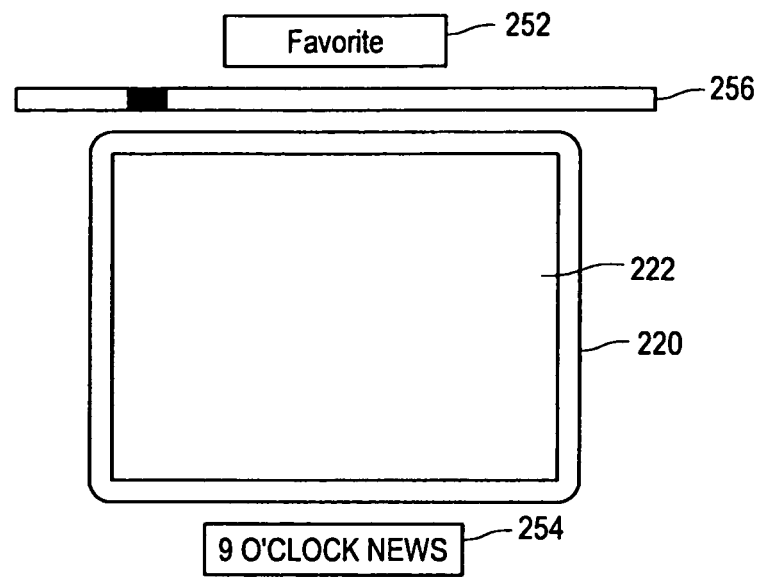
FIG. 6 is an illustration showing an example of a thumbnail image 220.

FIG. 6 is an illustration showing an example of the thumbnail image 220.

An indicator 256 may be displayed when the total time and the elapsed time by now of the content are known. In the indicator 256, for example, the total time is displayed as a horizontally long bar, and the current time is highlighted.

As shown in FIG. 4, the screen 200 displayed in the multiple content display mode includes a related information display area 232. In the related information display area 232, information related to the content displayed in the image display area 202 is displayed. For example, a logo, an icon indicating the type of the content, a channel name, the title of the content, a time display, and the like are displayed in the related information display area 232.

Further, as shown in FIG. 4, the screen 200 displayed in the multiple content display mode includes an attached information display area 234. Information related to the entire display device 10 such as, for example, a time display is displayed in the attached information display area 234. The related information display area 232 and the attached information display area 234 may be displayed on a fixed position on the screen 200, or may be moved by a user operation.

[Panel Display Mode]

FIGS. 13 to 16 are illustrations showing a screen 300 displayed in the panel display mode. The panel display mode displays a plurality of contents by thumbnail images on a panel. The plurality of contents displayed on the panel belong to a layer lower than a layer of the contents displayed in the multiple display mode.

As shown in FIGS. 13 to 16, the screen 300 displayed in the panel display mode includes an image display area 302, panel display areas 312, 314, 316, and 318, and the like. In the image display area 302, a reproduced content and a broadcast content are displayed. In the panel display areas 312, 314, 316, and 318, a representative image related to a plurality of contents, an icon image, text information related to a content, and the like are displayed.

Figure 13:
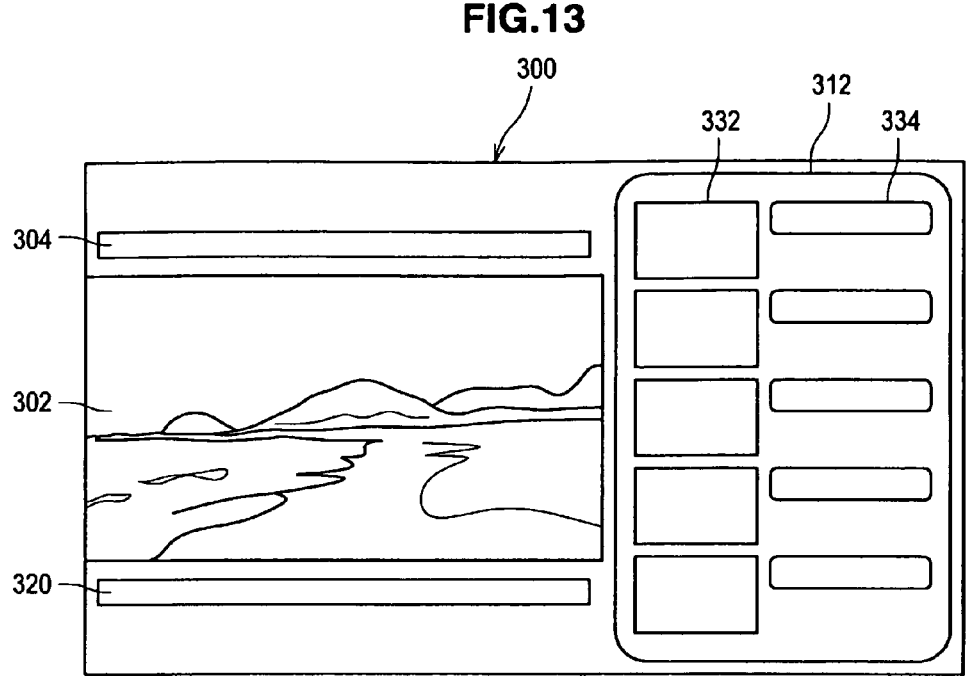
FIG. 13 is an illustration showing a screen 300 of a panel display mode on which a panel display area 312 is displayed.

As shown in FIG. 13, the screen 300 displayed in the panel display mode further includes a related information display area 304 and a panel information display area 320. In the related information display area 304, information related to the content displayed in the image display area 302 is displayed. In the panel information display area 320, information complementing the information displayed in the panel display areas 312, 314, 316, and 318 is displayed.

Figure 14:
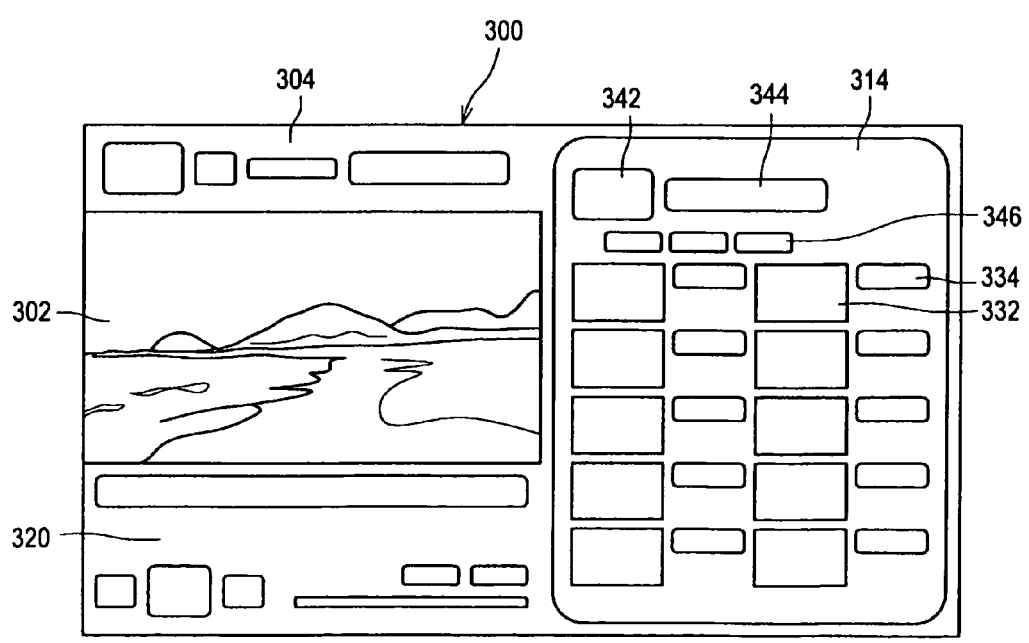
FIG. 14 is an illustration showing a screen 300 of a panel display mode on which a panel display area 314 is displayed.

Although not shown in FIGS. 13 and 14, in the screen 300 of the panel display mode shown in FIGS. 13 and 14, a plurality of thumbnail images may be displayed in a single horizontal row in a lower part of the screen (simultaneous display mode) in the same way as in the thumbnail display area 212 of the multiple content display mode.

[Simultaneous Viewing Mode]

Figure 18:
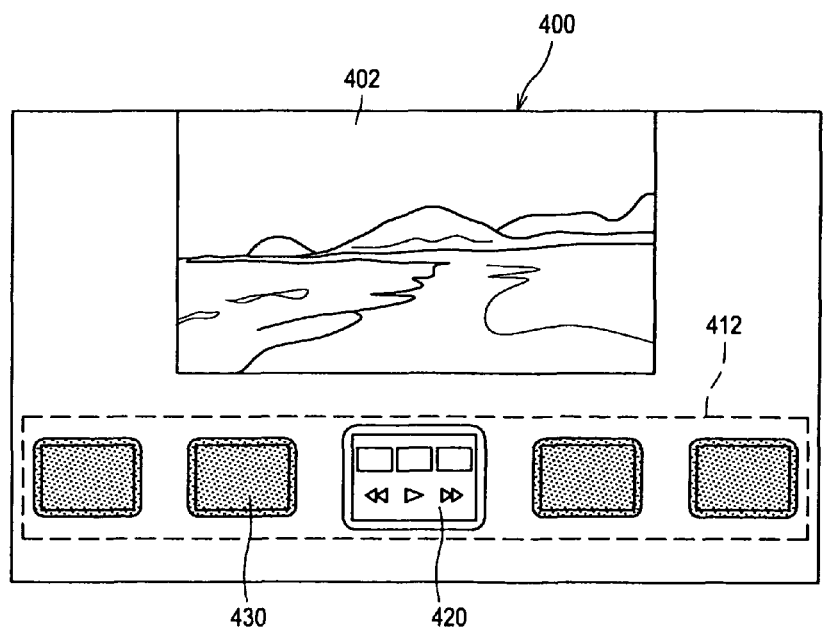
FIG. 18 is an illustration showing a screen 400 displayed in a simultaneous viewing mode.

FIG. 18 is an illustration showing a screen 400 displayed in the simultaneous viewing mode.

As shown in FIG. 18, the screen 400 displayed in the simultaneous viewing mode includes an image display area 402 and a thumbnail display area 412. In the image display area 402, a reproduced content and a broadcast content are displayed. In the thumbnail display area 412, a reproduction control panel 420 and thumbnail images 430 are displayed. The thumbnail images 430 are thumbnail images other than the reproduction control panel 420.

The reproduction control panel 420 can be displayed in the thumbnail display area 212 of the multiple content display mode described above, and when a user selects the reproduction control panel 420, the mode transits to the simultaneous viewing mode. In the example shown in FIG. 18, the thumbnail images 430 are displayed darker than the reproduction control panel 420, or the reproduction control panel 420 is displayed in a highlighted manner, so that the reproduction control panel 420 is highlighted.

On the reproduction control panel 420, controls such as replay, fast forward, fast rewind, and the like can be performed on the content displayed in the image display area 402 or contents other than the content displayed in the image display area 402.

Figure 19:
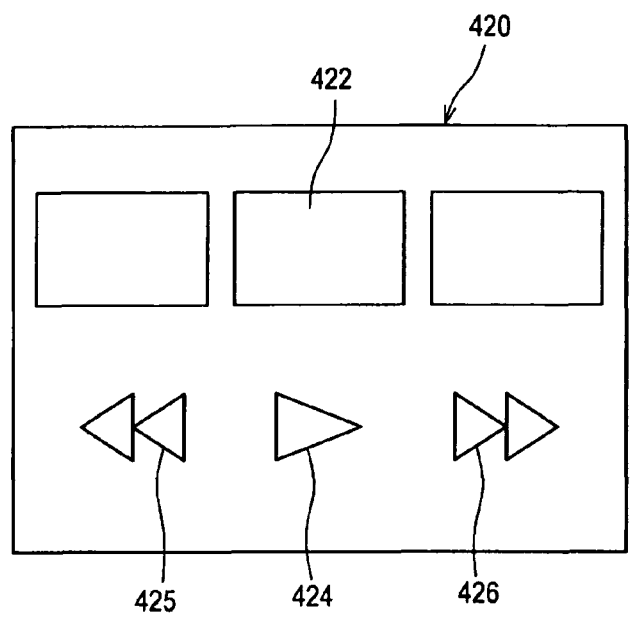
FIG. 19 is an illustration showing a reproduction control panel 420.

FIG. 19 is an illustration showing the reproduction control panel 420.

On the reproduction control panel 420, a plurality of thumbnail images 422 and buttons including a replay button 424, a fast rewind button 425, and a fast forward button 426 which can be selected by a user are displayed. Based on this, the user can view contents in both the image display area 402 and the reproduction control panel 420.

[Transition of Display Mode]

Figure 3:
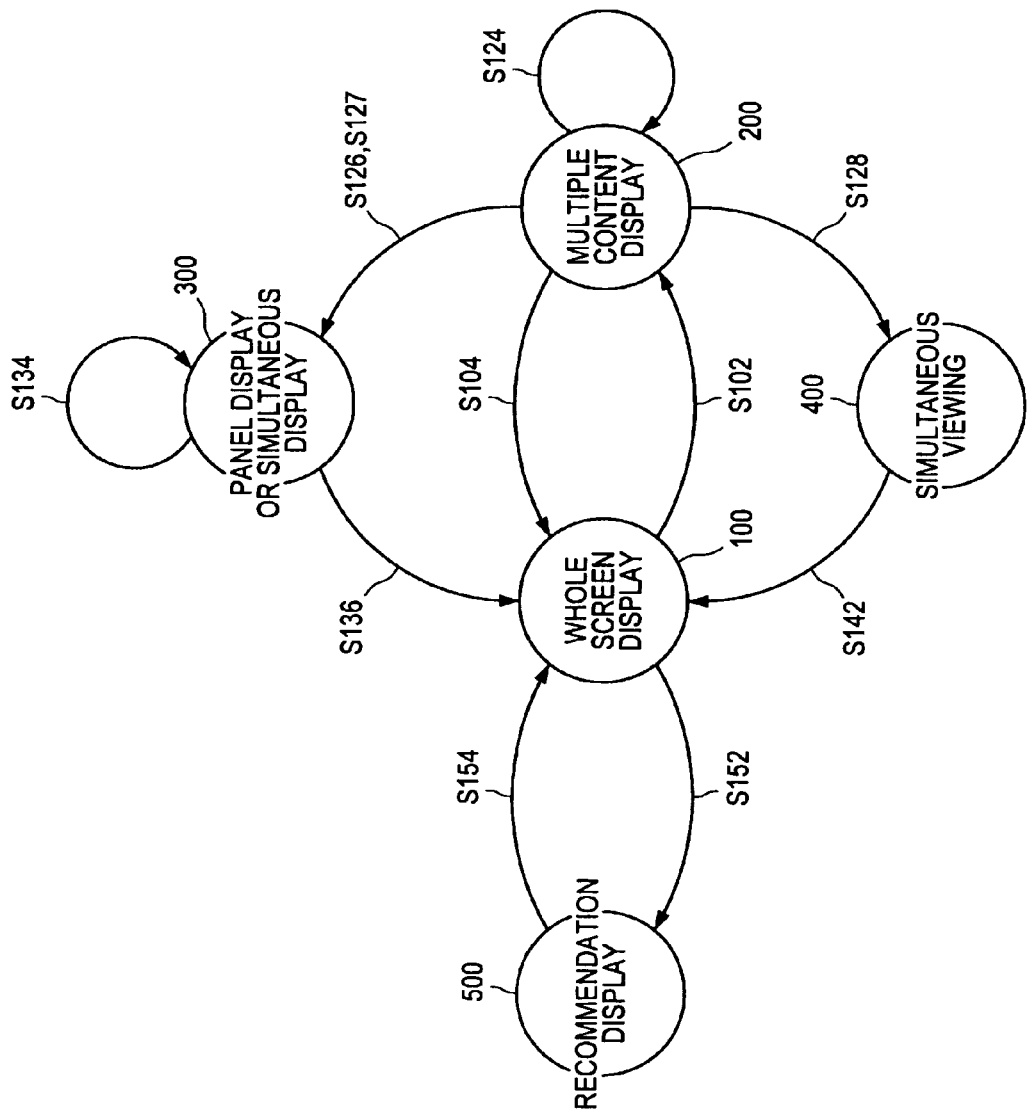
FIG. 3 is a transition diagram showing a transition of the plurality of display modes that can be displayed on the display device 10 according to the embodiment.

FIG. 1 is an illustration showing a plurality of display modes that can be displayed on the display device 10 according to the embodiment. FIG. 3 is a transition diagram showing a transition of the plurality of display modes that can be displayed on the display device 10 according to the embodiment.

First, in the screen 100 displayed in the whole screen display mode, when a "MV (Multi View)" button on the remote control 600 is pressed, the screen 100 transits to the screen 200 displayed in the multiple content display mode (step S102). On the contrary, in the screen 200 displayed in the multiple content display mode, when the "MV (Multi View)" button on the remote control 600 is pressed, the screen 200 returns to the screen 100 displayed in the whole screen display mode (step S104).

In the screen 200 displayed in the multiple content display mode, when a left key or a right key on the remote control 600 is operated, the thumbnail images displayed on the screen 200 can be moved leftward or rightward (step S112). In the multiple content display mode, when one thumbnail image is selected by "OK" button on the remote control 600, the displayed content is switched, or the multiple content display mode transits to the panel display mode or the simultaneous viewing mode.

The way how the content is switched varies depending on the type of the content, and for example, the selected content is displayed in a screen 102 in the whole screen display mode (step S122), or displayed in a screen 202 in the multiple content display mode (step S124). When transiting to the panel display mode, the multiple content display mode transits to the screen 300 on which the display panel area 312 is displayed (step S126), or to the screen 300 on which the display panel area 316 is displayed (step S127). Further, the multiple content display mode may transit to the simultaneous viewing mode (step S128).

When the multiple content display mode transits to the panel display mode (steps S126 and S127), the panel display areas 312 or 316 may be displayed with the thumbnail display area 212, which is displayed on the screen 200 in the multiple content display mode, being remained. This display mode may be also called a simultaneous display mode.

In the screen 300 displayed in the panel display mode, when an up key or a down key on the remote control 600 is operated, the thumbnail images displayed in the panel display area 312 or 316 on the screen 300 can be moved upward or downward (step S132). In the panel display mode, when one thumbnail image is selected by the "OK" button on the remote control 600, the displayed content is switched (step S134).

In the screen 300 displayed in the panel display mode, when the "MV" button on the remote control 600 is operated, the screen 300 returns to the screen 100 displayed in the whole screen display mode (step S136). In the screen 400 displayed in the simultaneous viewing mode, when the "MV" button on the remote control 600 is operated, the screen 400 returns to the screen 100 displayed in the whole screen display mode (step S142).

Figure 21:
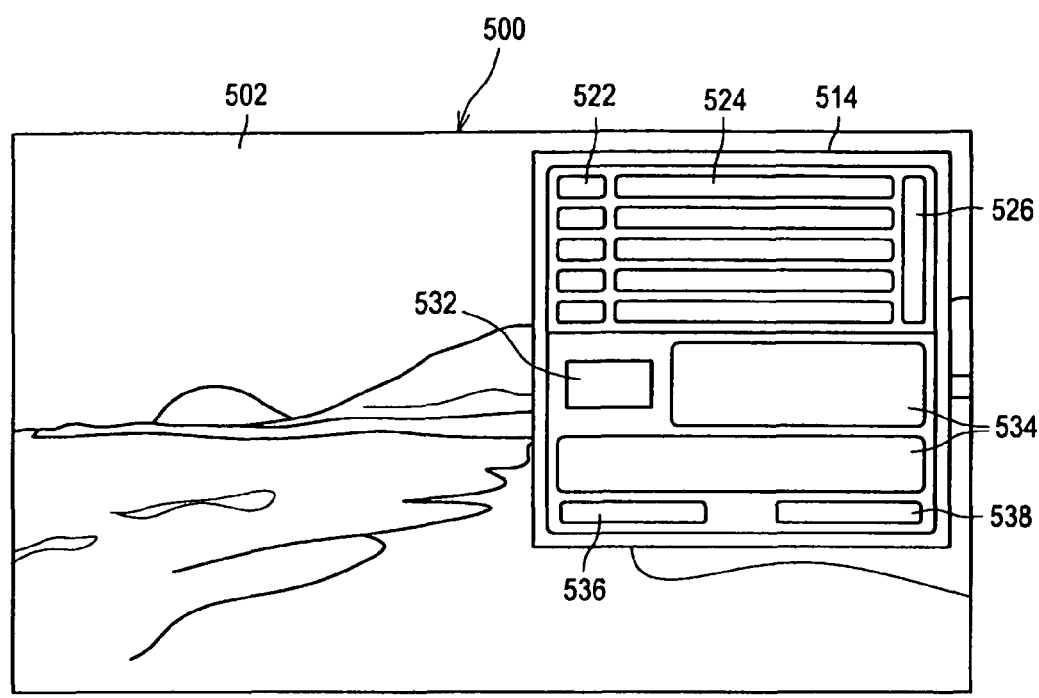
FIG. 21 is an illustration showing a screen 500 on which a recommendation display panel 514 is displayed.

While the screen 100 in the whole screen display mode is being viewed, if new content information or related information is obtained, the screen 100 transits to a screen 500 on which a recommendation display panel 512 is displayed (step S152). When the recommendation display panel 512 is enlarged and displayed, a more detailed recommendation display panel 514 as shown in FIG. 21 is displayed on the screen 500. In the screen 500 on which the recommendation display panel 512 or 514 is displayed, when the "MV" button on the remote control 600 is operated, the screen 500 returns to the screen 100 displayed in the whole screen display mode (step S154).

When a display mode other than the multiple content display mode and the panel display mode transits to the multiple content display mode or the panel display mode, the thumbnail image that is focused in the screen 200 or the screen 300 is determined in advance.

<3. Details of Multiple Content Display Mode>

[Thumbnail Image with Indicator]

Figure 8A:
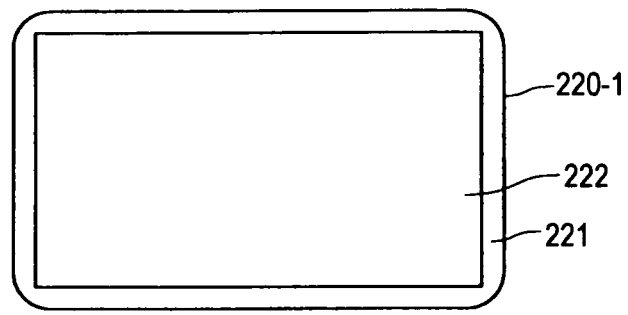
FIGS. 8A to 8C are illustrations each showing an example of a thumbnail image 220.
Figure 8B:
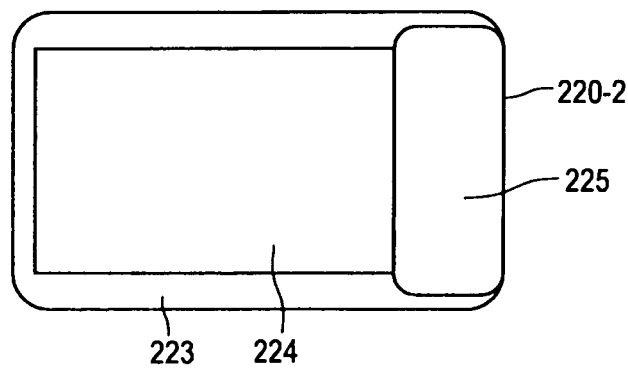
Figure 8C:
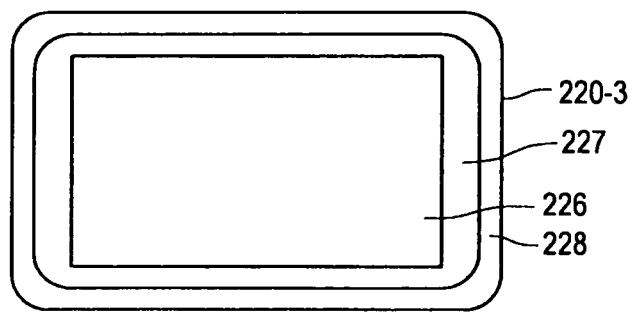

As shown in FIGS. 8A to 8C, the thumbnail image 220 displayed in the thumbnail display area 212 may include an indicator (mark) 225 or 227 indicating to which display mode the display mode transits when the thumbnail image is selected. FIGS. 8A to 8C are illustrations each showing an example of the thumbnail image 220, and FIGS. 8A to 8C are diagrams shown by extracting only a thumbnail image 220 from the thumbnail display area 212.

In a case in which the display mode transits to the whole screen display mode, for example, the thumbnail image 220 is the thumbnail image 220-1 shown in FIG. 8A, which includes an image portion 222 and a frame 221. The frame 221 encloses the circumference of the image portion 222.

Figure 15:
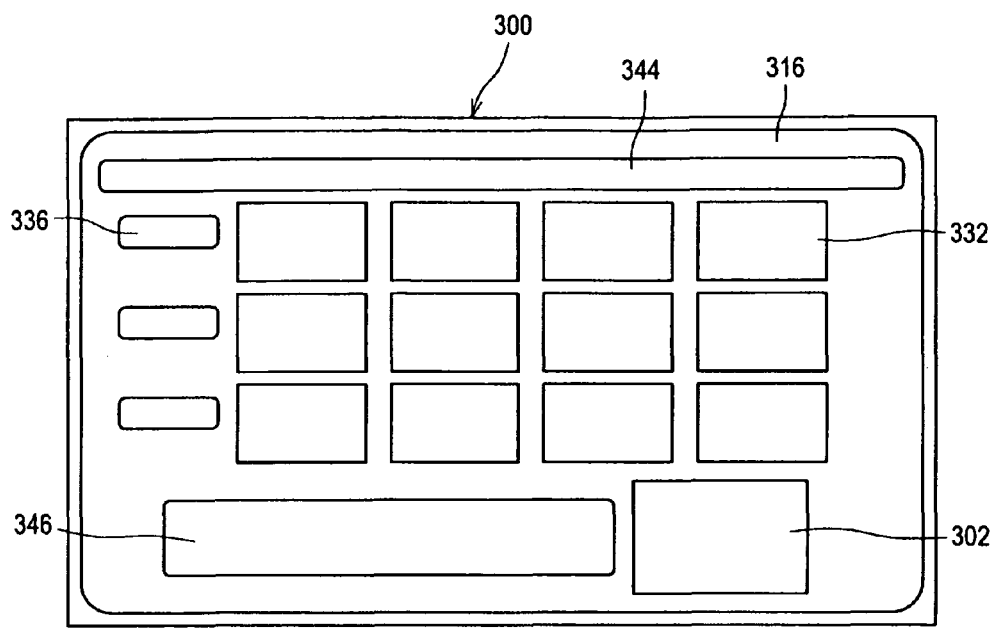
FIG. 15 is an illustration showing a screen 300 of a panel display mode on which a panel display area 316 is displayed.

In a case in which the display mode transits to the panel display mode, for example, the thumbnail image 220 is the thumbnail image 220-2 shown in FIG. 8B. The thumbnail image 220-2 includes a frame 223, an image portion 224, and an indicator 225. The frame 223 encloses the circumference of the image portion 224 and the indicator 225. The indicator 225 is arranged at the side of the image portion and has a vertically long rectangular shape. When the thumbnail image 220-2 including the indicator 225 is selected, for example, the display mode transits to the panel display mode as shown in FIGS. 13 to 15.

In a case in which the display mode transits to a simultaneous display of the multiple content display mode and the panel display mode, for example, the thumbnail image 220 is the thumbnail image 220-3 shown in FIG. 8C. The thumbnail image 220-3 includes an image portion 226, an indicator 227, and a frame 228. The indicator 227 is arranged enclosing the entire image portion 226, and has a horizontally long rectangular shape. The frame 228 encloses the circumference of the image portion 226 and the indicator 227. When the thumbnail image including the indicator 227 is selected, the display mode transits to the simultaneous display mode in which the thumbnail display area is displayed in the panel display mode.

As described above, by simultaneously displaying an indicator along with an image portion (representative image or icon image) in the thumbnail image, it is easy to cause a viewer to view and recognize to which display mode among a plurality of existing display modes the display mode transits. In other words, it is possible to notify the viewer of the matter of the content by the image portion, and notify the viewer of the display mode by the indicator.

The representative image to be displayed in the image portion of the thumbnail image may be a single still image, or a plurality of still images that are sequentially displayed. The plurality of still images may be a plurality of scenes in a single content, or may be a plurality of still images respectively corresponding to each of a plurality of contents. When the thumbnail image 220A is centered and highlighted, a plurality of still images can be sequentially switched by an operation of the up key or the down key on the remote control 600 by a user. In this way, the user can select a scene or a content desired to be displayed. When the thumbnail image 220A is not centered and not highlighted, the plurality of still images are switched at a constant interval of, for example, 5 to 60 seconds, like a slide show.

[Display Operation of Thumbnail Image]

Figure 24:
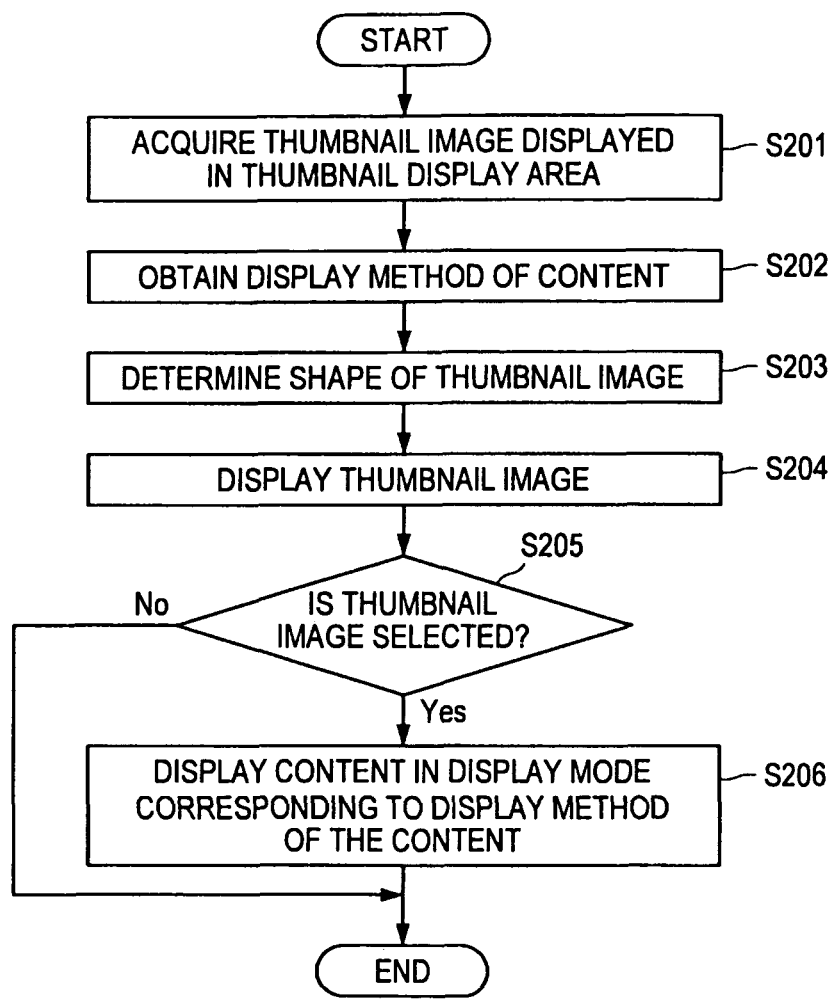
FIG. 24 is a flowchart showing an operation related to display of a thumbnail image.

FIG. 24 is a flowchart showing an operation related to display of a thumbnail image.

When the display device 10 obtains a content, an image to be displayed in the image portions 222, 224, and 226 of the thumbnail image 220 to be displayed in the thumbnail display area 212 can be acquired (step S201). Also, a display method indicating that the content should be displayed in the screen 100 of the whole screen display mode, should be displayed in the screen 300 of the panel display mode, or should be displayed in the screen of the simultaneous display mode depending on the content is obtained (step S202). The display method may be determined by the display device 10 on the basis of the content, or may be determined by a provider of the content or the like.

Next, the shape of the thumbnail image 220 (for example, FIGS. 8A to 8C) is determined so that the shape corresponds to the display method of the content (step S203). Thereafter, when the display mode transits to the multiple content display mode, the thumbnail image 220 is displayed on the screen 200 (step S204). When the thumbnail image 220 is selected by a user (step S205), the content corresponding to the thumbnail image is displayed. At this time the content is displayed in a display mode corresponding to the display method of the content (step S206). Since the display method of the content is represented by the shape of the thumbnail image, the user can predict to which display mode the display mode transits before the display mode transits.

[About Thumbnail Display Area 212]

Figure 5:
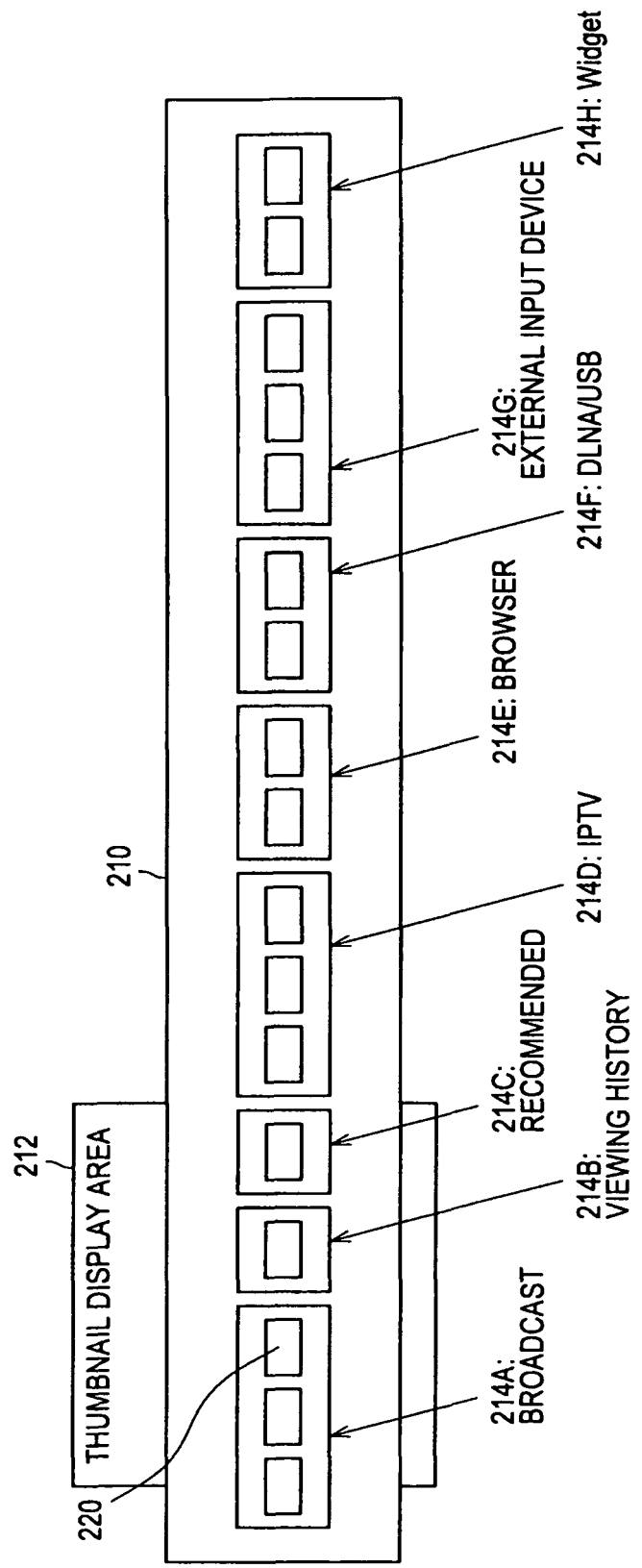
FIG. 5 is an illustration showing a concept of all stored images 210.

The thumbnail image 220 displayed in thumbnail display area 212 may be determined in advance before the shipment of the display device 10, or may be added by a user when the display device 10 is used. FIG. 5 is an illustration showing a concept of all stored images 210. As shown in FIG. 5, regarding all the stored images 210, the thumbnail images 220 are arranged in a single horizontal row. The thumbnail images 220 displayed in the thumbnail display area 212 are consecutive five thumbnail images 220 in all the stored images 210. In the thumbnail images 220, by operating the left key or the right key on the remote control 600, it is possible to display an adjacent hidden thumbnail image 220, or hide a thumbnail image 220 that is displayed.

The thumbnail images included in all the stored images 210 can be classified into some categories 214. For example, the categories 214 include a user favorite broadcast program category 214A, a viewing history category 214B, a recommended program category 214C, and a network delivery content category 214D obtained from IPTV (VOD) or the like. Also, there are a browser bookmark category 214E and a content category 214F in an external device connected by DLNA (Digital Living Network Alliance), USB, or the like. Furthermore, there are an image data/music data/video data category 214G obtained from an external device connected by an HDMI cable or the like, and a Widget category 214H. These categories are arranged sequentially from left to right in all the stored images 210.

In the multiple content display mode, the thumbnail image displayed at the center is highlighted or enlarged. The thumbnail image displayed at the center can be selected by a "decision" button, and when the "decision" button is pressed, the screen transits to a content related to the thumbnail image. The thumbnail image displayed at the center can be shifted to the adjacent thumbnail image by operating the left key or the right key on the remote control 600.

[About Viewing History Thumbnail Image]

Figure 7:
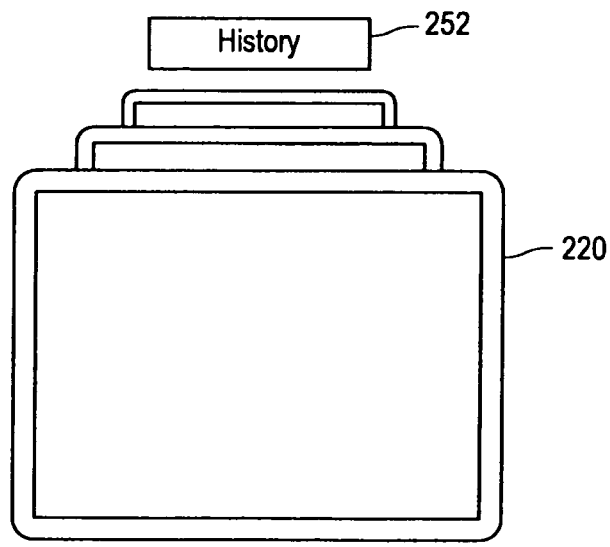
FIG. 7 is an illustration showing a viewing history thumbnail image 220.

FIG. 7 is an illustration showing an example of a viewing history thumbnail image 220, and FIG. 7 is a diagram shown by extracting only a viewing history thumbnail image 220 from the thumbnail display area 212.

Differently from other thumbnail images 220, the viewing history thumbnail image 220 is displayed by overlapping a plurality of representative images, and displayed in a pseudo three-dimensional manner as if a plurality of images were arranged in the depth direction. The plurality of images are constituted by representative images of the contents which the user has viewed on the basis of user's viewing history.

The thumbnail image displayed on the most front surface can be selected by a "decision" button, and when the "decision" button is pressed, the screen transits to a content related to the thumbnail image. The image placed on the back surface can be displayed on the front surface by operating the up key or the down key on the remote control 600.

When the display mode transits from the whole screen display mode to the multiple content display mode, the thumbnail image 220 that is displayed and highlighted at the center of the thumbnail display area 212 of the multiple content display mode may be set to be the viewing history thumbnail image 220 shown in FIG. 7. The image 220 on the most front surface of the viewing history thumbnail image 220 after the transition is an image related to the content displayed in the image display area of the whole screen display mode before the transition to the multiple content display mode.

In the viewing history, information related to contents viewed by a user is accumulated by, for example, a favorite view history collection algorism. The favorite view history collection algorism automatically collects information indicating what content and when the user viewed, and the favorite view history collection algorism estimates a favorite of the user on the basis of the collected viewing history. The favorite view history collection algorism extracts a viewing history that may be selected by the user in the future on the basis of the favorite of the user and the viewing history in the past.

[About Adding Thumbnail Image to Thumbnail Display Area 212]

Figure 9:
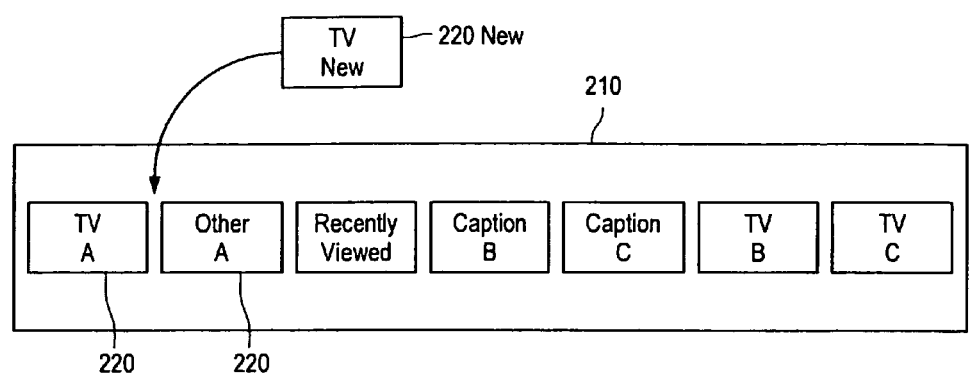
FIG. 9 is a conceptual diagram showing an operation in which a thumbnail image 220 is newly added to all the stored images 210.
Figure 10:
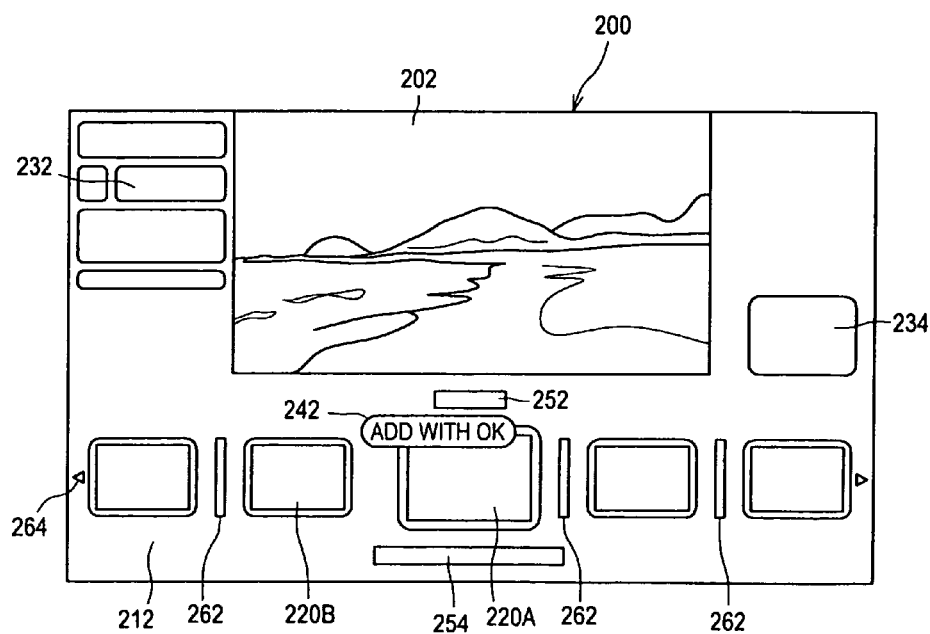
FIG. 10 is an illustration showing a screen 200 of the multiple content display mode.
Figure 11:
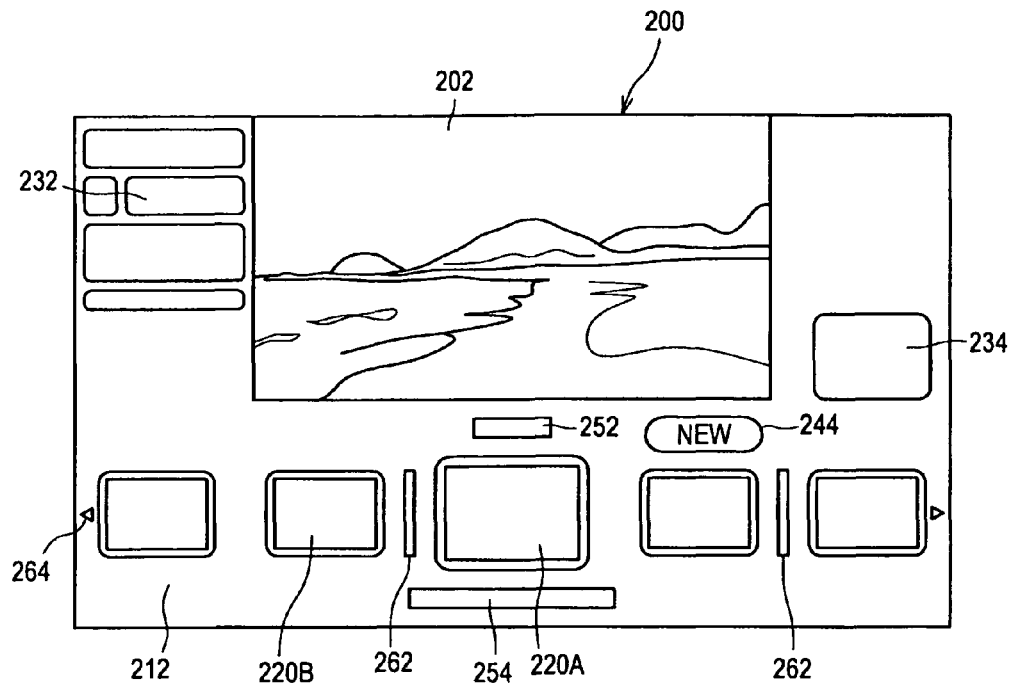
FIG. 11 is an illustration showing a screen 200 of the multiple content display mode.
Figure 12:
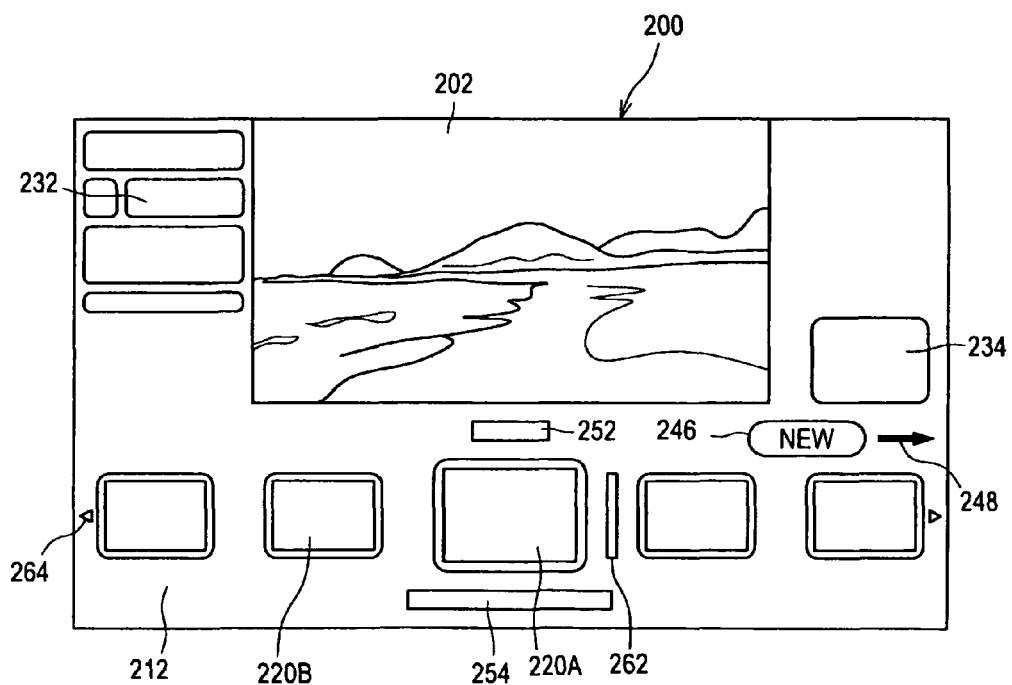
FIG. 12 is an illustration showing a screen 200 of the multiple content display mode.
Figure 25:
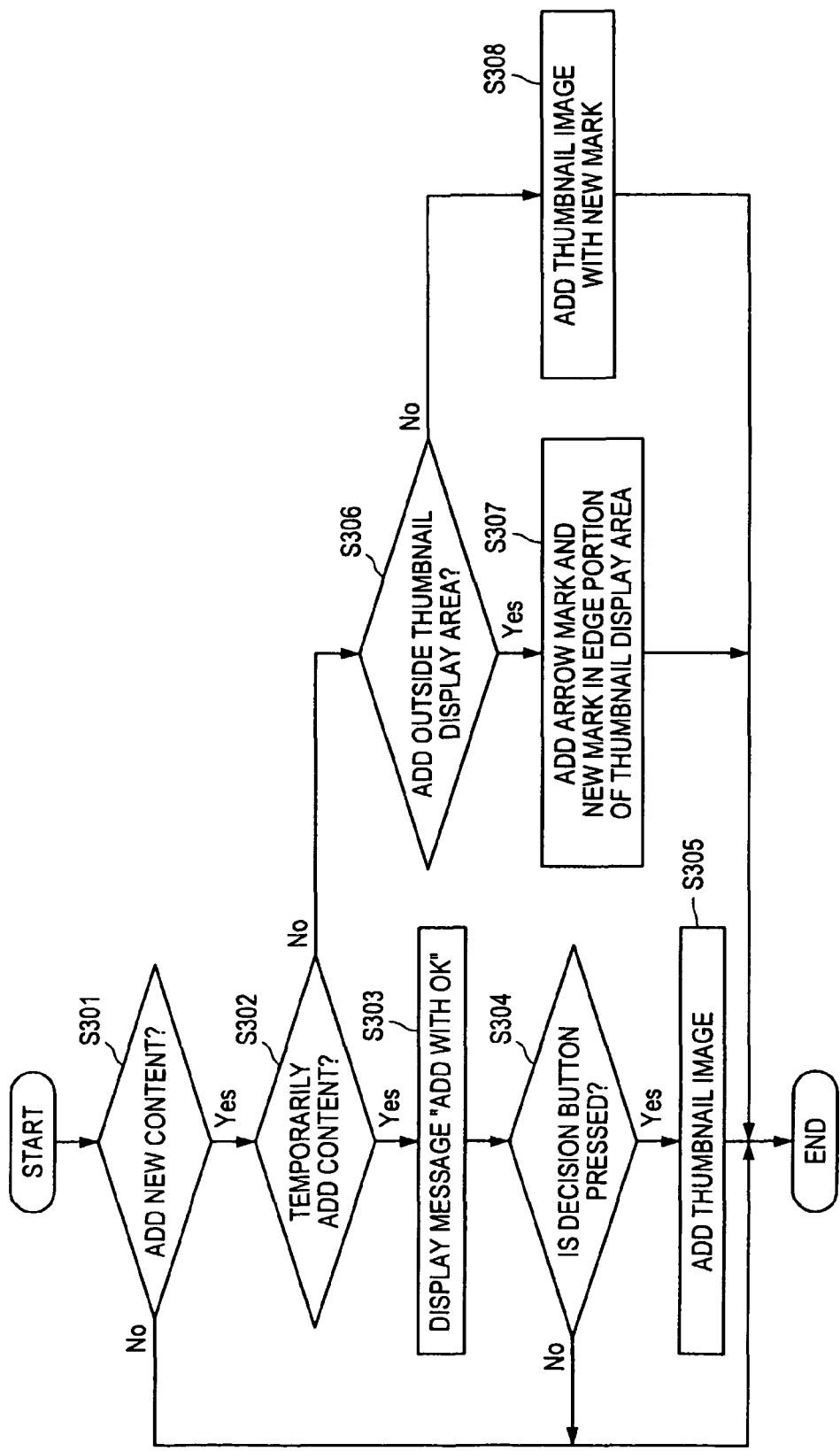
FIG. 25 is a flowchart showing an operation related to addition of a thumbnail image to a thumbnail display area 212.

FIG. 9 is a conceptual diagram showing an operation in which the thumbnail image 220 is newly added to all the stored images 210. FIGS. 10 to 12 are illustrations showing the screen 200 of the multiple content display mode. FIG. 25 is a flowchart showing an operation related to adding the thumbnail image to the thumbnail display area 212.

A thumbnail image related to a favorite broadcast program content or a network delivery content displayed in the thumbnail display area 212 can be added to all the stored images 210 when a new content or service is detected via a broadcast signal or a network (step S301). The detection of the new content or service is performed on the basis of, for example, user's degree of favor, and a content and service with a high degree of favor are a subject to be added. Or, the user may add a thumbnail image to all the stored images 210 by using the remote control 600.

Although the detected new content or service may be immediately added to the thumbnail display area 212, the user may determine whether or not the content or service should be added. When the user can determine, the content or service are in a temporarily added state (step S302).

For example, when a new content or service is detected, as shown in FIG. 10, a newly addable thumbnail image 220A is highlighted or enlarged in the thumbnail display area 212, and a message 242 of "Add with OK" is displayed above the thumbnail image 220A (step S303). The timing when a new content or service is detected is, for example, when the content has not been viewed by the user and a corresponding thumbnail image is not included in all the stored images 210.

In a stage when the message 242 of "Add with OK" is displayed above the thumbnail image 220A, the thumbnail image 220 is temporarily added to all the stored images 210. When the "decision (OK)" button on the remote control 600 is pressed by the user (step S304), the thumbnail image 220 is duly added to all the stored images 210, and thereafter the thumbnail image 220 can be displayed in the multiple content display mode (step S305).

On the other hand, the detected new content or service may be immediately added to the thumbnail display area 212 (step S306 to step S308). There is a case in which a thumbnail image related to a content or service to which an indicator "NEW" can be added is included in the thumbnail display area 212 and displayed on the screen 200 (step S306). In this case, when a new content or service is detected, as shown in FIG. 11, an indicator (mark) 244 of "NEW" is displayed above a thumbnail image 220B related to the newly detected content or service in the thumbnail display area 212 (step S308). Or, when the temporarily added new content or service is duly added, the indicator (mark) 244 of "NEW" may be displayed above the thumbnail image 220B related to the newly added content or service for a predetermined time period estimated to be necessary for the user to recognize the indicator 244.

Further, there is a case in which a thumbnail image related to a content or service to which an indicator "NEW" can be added is outside the thumbnail display area 212 and not displayed on the screen 200 (step S306). In this case, an arrow mark 248 and an indicator 246 of "NEW" are displayed in an edge portion of the thumbnail display area 212 (step S307). In this way, even when the thumbnail image related to newly inserted content or service is outside the thumbnail image display area 212, the user can easily know in which direction the thumbnail image is added. The user can reach the newly inserted thumbnail image by referring the arrow mark 248 and operating the right key or the left key on the remote control 600.

When a new content or service is detected, the thumbnail image is inserted in a category to which the detected content belongs in a plurality of thumbnail images arranged in a single horizontal row with the viewing history thumbnail image 220 being centered. At this time, if a plurality of thumbnail images are already inserted in the category, the thumbnail image is inserted near the viewing history thumbnail image 220 in the same category. In this way, when the display mode transits to the multiple content display mode, if the viewing history thumbnail image 220 is displayed at the center, a scroll operation of the thumbnail image can be reduced, so that the user can check the newly added content or service quickly.

[Rearrangement of Thumbnail Images in Thumbnail Display Area 212]

Figure 26:
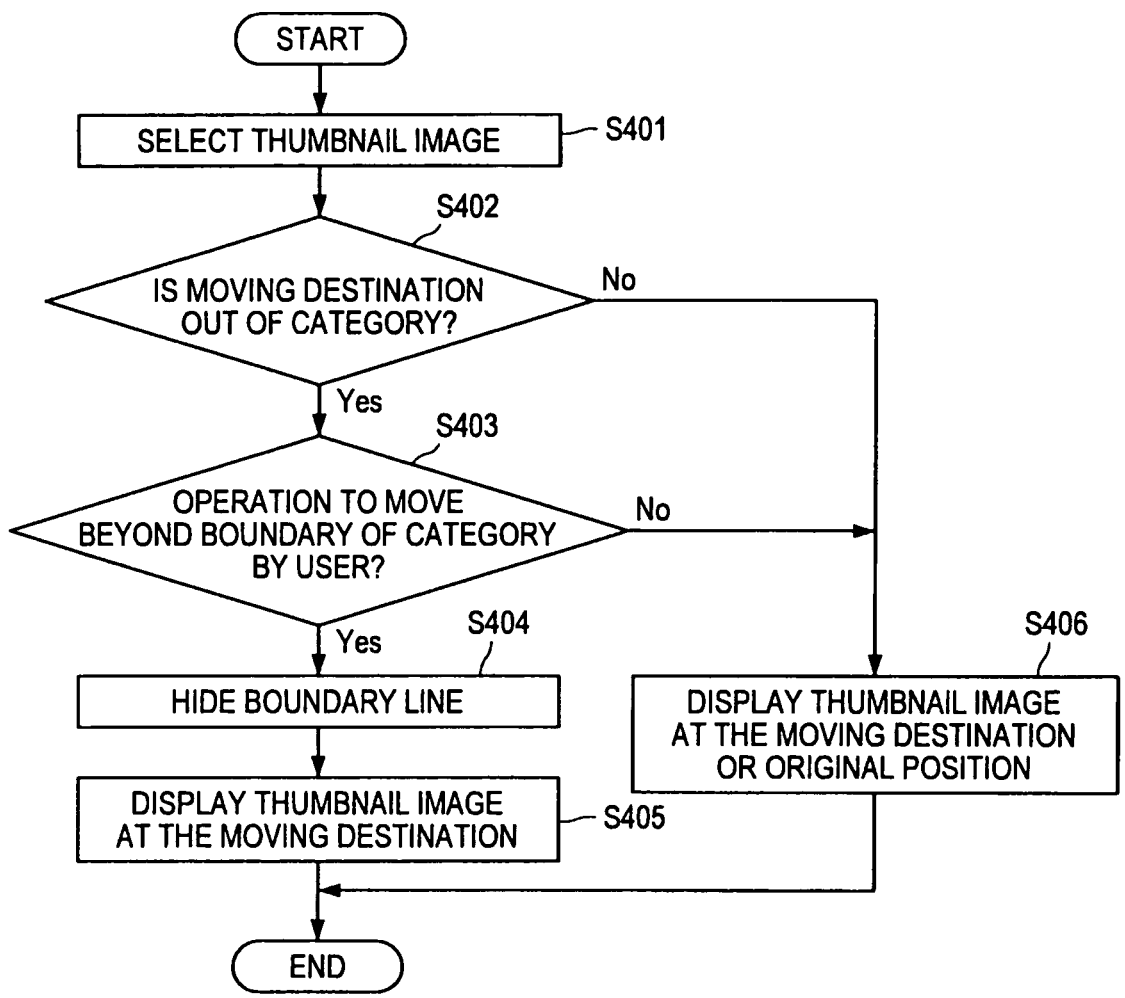
FIG. 26 is a flowchart showing an operation related to rearrangement of thumbnail images in the thumbnail display area 212.

FIG. 26 is a flowchart showing an operation related to rearrangement of the thumbnail images in the thumbnail display area 212.

The plurality of categories are arranged in the manner described in FIG. 5 and [Thumbnail Display Area 212] (hereinafter referred to as "normal arrangement") in all the stored images 210. At this time, a boundary line 262 is displayed between the categories as shown in FIGS. 10 to 12.

On the other hand, the position of the thumbnail image 220 can be changed in all the stored images 210 by a user operation. First, the thumbnail image 220 desired to be moved is selected by the user (step S401). Then, whether or not the moving destination of the thumbnail image 220 is out of the category to which the thumbnail image 220 belongs (goes beyond the boundary line 262) by the user operation is determined (step S402).

The rearrangement method of the thumbnail images 220 may be a method in which the thumbnail image 220 is moved by operating the left key or the right key on the remote control 600 after the thumbnail image 220 desired to be moved is selected. Or, the rearrangement method may be a method in which the selected thumbnail image 220 is released at the moving destination after the thumbnail image 220 desired to be moved is selected by a free cursor method that enables a pointer to move freely on the screen. An arrow 264 may be displayed on the screen 200, and when the arrow 264 is selected, the thumbnail image 220 moves in the same direction as the arrow or the opposite direction to the arrow.

When moving the thumbnail image 220 beyond the boundary line 262, if the remote control 600 is used, the thumbnail image 220 is controlled not to go beyond the boundary line 262 until the left key or the right key is pressed twice consecutively. When the free cursor method is used, the thumbnail image 220 is controlled not to go beyond the boundary line 262 unless the thumbnail image 220 is moved with an acceleration greater than a predetermined value. In this way, the user can easily recognize that the normal arrangement is canceled and the thumbnail images 200 can be arranged regardless of the category. Also, it is possible to prevent the normal arrangement from being canceled by an operational error while the thumbnail image 220 is selected.

In the rearrangement of the thumbnail images 220, it is determined whether or not a necessary operation to move beyond the boundary of the category as described above is performed (step S403). When the operation to move beyond the boundary of the category is performed, all the boundary lines 262 are hidden (step S404). Then, the thumbnail image is displayed at the moving destination (step S405).

On the other hand, in a user operation, when the moving destination of the thumbnail image does not go beyond the boundary line of the category, and when the operation to move beyond the boundary of the category is not performed, the thumbnail image is displayed at the moving destination or the original position in the category (step S406). At this time, the boundary lines 262 are still displayed. In this way, it is possible to check the normal arrangement and the arrangement set by a user on the basis of presence or absence of the boundary lines 262. When all the boundary lines 262 are hidden by the rearrangement operation of the thumbnail images by a user, if the boundary lines 262 are controlled to disappear along with an animation on the screen, the user can clearly recognize the operation to move beyond the boundary of the category.

[Network Delivery Content Category 214D]

The thumbnail images 220 included in the network delivery content category 214D indicate content providers respectively. A content provider provides a plurality of contents. Therefore, when the thumbnail image 220 included in the network delivery content category 214D is selected, the display mode transits to the panel display mode in accordance with the thumbnail image with an indicator. The user can select one content from a plurality of contents on the panel.

<4. Details of Panel Display Mode>

[Panel Display Area]

FIGS. 13 to 16 are illustrations respectively showing the screens 300 of the panel display mode on which the panel display areas 312, 314, 316, and 318 are displayed.

For example, as shown in FIG. 13, a plurality of thumbnail images 332 and text information items 334 are displayed in the panel display area 312. The thumbnail images 332 are representative images related to a plurality of contents, and one still image may be displayed in the thumbnail image 332 or a plurality of still images may be sequentially displayed in the thumbnail image 332. The text information items 334 are descriptions, titles, and the like respectively explaining the plurality of contents.

For example, as shown in FIG. 14, a plurality of thumbnail images 332, text information items 334, a logo 342, a provider name 344, related information items 346, and the like are displayed in the panel display area 314. The logo 342 is, for example, a logo of a provider which provides various contents via a network by using the panel display area 314. The provider name 344 is the name of the provider. The related information items 346 are information related to the provider and information related to the contents arranged in the panel display area 314.

Further, as shown in FIG. 15, a plurality of thumbnail images 332, category names 336, a provider name 344, and related information 346 are displayed in the panel display area 316. The category names 336 are names of category to which a plurality of contents belongs, and displayed when contents are arranged for each category. In the example shown in FIG. 15, the panel display area 316 expands to the entire screen 300. In the layout, the image display area 302, which displays a reproduced or broadcast content, is a part of the panel display area. The panel display area 316 may not include the image display area 302.

Figure 16:
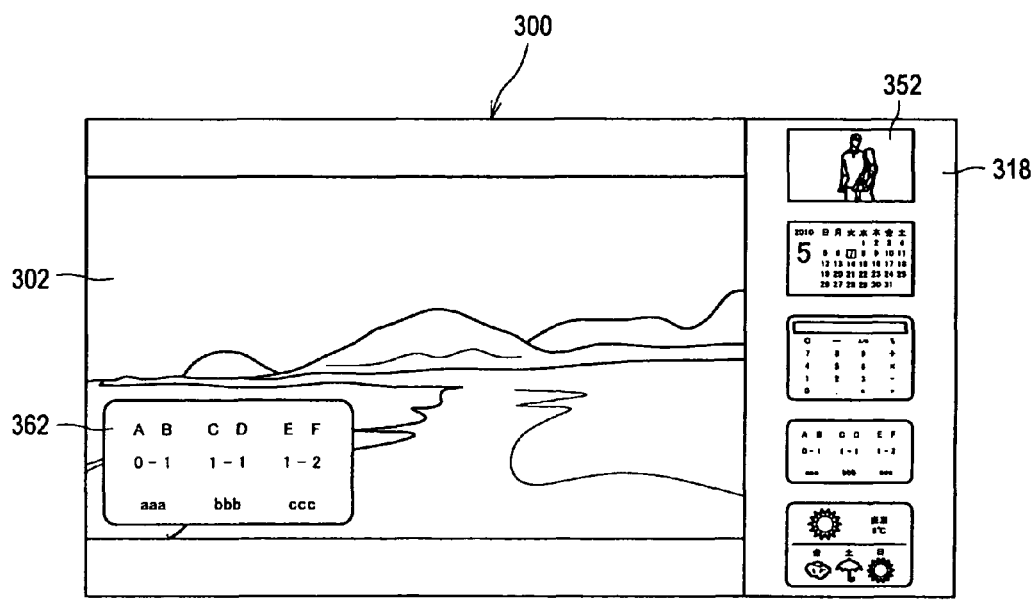
FIG. 16 is an illustration showing a screen 300 of a panel display mode on which a panel display area 318 is displayed.

Further, as shown in FIG. 16, a plurality of widget images 352 are displayed in the panel display area 318. The widget image 352 is an image indicating a widget such as a mini-application. The widget includes an application for displaying a favorite image, an application for displaying the latest calendar, a weather forecast, or a result of a sports event, and the like.

The size, design, contents to be arranged of the panel display areas 312, 314, 316, and 318 may be set in the display device 10 in advance, or may be customized by a user.

Further, like an example shown in FIGS. 14 and 15, the design of the panel display areas 314 and 316 for arranging the provided contents may be performed by the provider which performs a content delivery service. In this case, the display device 10 receives information related to the panel display areas 314 and 316, and content information via a network. Based on this, a panel desired by the provider can be displayed on the screen 300 of the display device 10. The display device 10 can provide services and functions not included when the display device 10 is shipped.

[Display Sizes of Image Display Area 302 and Panel Display Areas 312, 314, 316, and 318]

The image display area 302 changes the display size in accordance with a size where information other than the image display area 302 is displayed, such as the panel display areas 312, 314, 316, and 318, and the thumbnail display area. Information amounts of the information to be displayed in the panel display areas 312, 314, 316, and 318 and the like are optimized in accordance with the sizes of the panel display areas 312, 314, 316, and 318.

Further, the panel display areas 312, 314, 316, and 318 may change the sizes of the panel display areas 312, 314, 316, and 318 in accordance with information amounts of the information to be displayed in the panel display areas 312, 314, 316, and 318.

[Superposed Display of Widget Image]

As shown in FIG. 16, the widget image 362 may be superimposed on the image display area 302. The superimposed display of the widget image 362 is realized by selecting one widget image 352, moving the widget image 352, and releasing the widget image 352 by using the remote control 600 while the widget images 352 are displayed in the panel display area 318. Although, in this embodiment, a case is described in which the widget image 362 is superimposed on the image display area 302, the present invention is not limited to this. For example, various information such as the thumbnail image and related information can also be superimposed on the image display area.

The widget image 362 can be superimposed on the image display area 302 only when the widget image 362 is information related to the content displayed on the image display area 302, or the widget image 362 can be superimposed regardless of the content displayed on the image display area 302.

As shown in FIG. 17, the widget image 362 can be superimposed not only on the image display area 302 in the screen 300 of the panel display mode, but also on the image display area 102 in the screen 100 of the whole screen display mode. For example, after once the widget image 362 is superimposed in the panel display mode, it may be possible to switch between visible and hidden of the widget image 362 by pressing a "screen display" button provided on the remote control 600. FIG. 17 is an illustration showing switching between visible and hidden of the widget image 362 in the screen 100 of the whole screen display mode.

[Related Information Display Area 304 and Panel Information Display Area 320]

The display sizes of the related information display area 304 and the panel information display area 320 are changed in accordance with the types and information amounts of the contents to be displayed in the image display area 302 and the panel display areas 312 and 314. The display sizes of the related information display area 304 and the panel information display area 320 may be changed in accordance with information amounts of information to be displayed.

The information to be displayed in the related information display area 304 and the panel information display area 320 may be switched between visible and hidden considering a relationship between the content displayed in the image display area 302 on the screen 300 and the contents to be displayed in the panel display area 312 or 314. For example, when it is determined that there is no competitive relationship between them, the panel display area 312 or 314 and the panel information display area 320 are displayed at the same time as the image display area 302 is displayed.

Or, on the contrary, there is an option in which the relationship between the content displayed in the image display area 302 on the screen 300 and the contents to be displayed in the panel display area 312 or 314 is not considered. In this case, for example, even when a competitive relationship is generated, the panel display area 312 or 314 and the panel information display area 320 are typically displayed at the same time as the image display area 302 is displayed.

The provider can determine whether or not to display the panel display area 312 or 314 and the panel information display area 320 considering the relationship between the content displayed in the image display area 302 on the screen 300 and the contents to be displayed in the panel display area 312 or 314. Based on this, the provider can perform a content providing service considering competitive relationship between advertised commercial goods and services or competitive relationship between sponsors. Also, the provider can deliver contents considering the shape of the panel display area and the shape of the corresponding panel information display area.

[Display Operation of Panel Display Mode]

Figure 27:
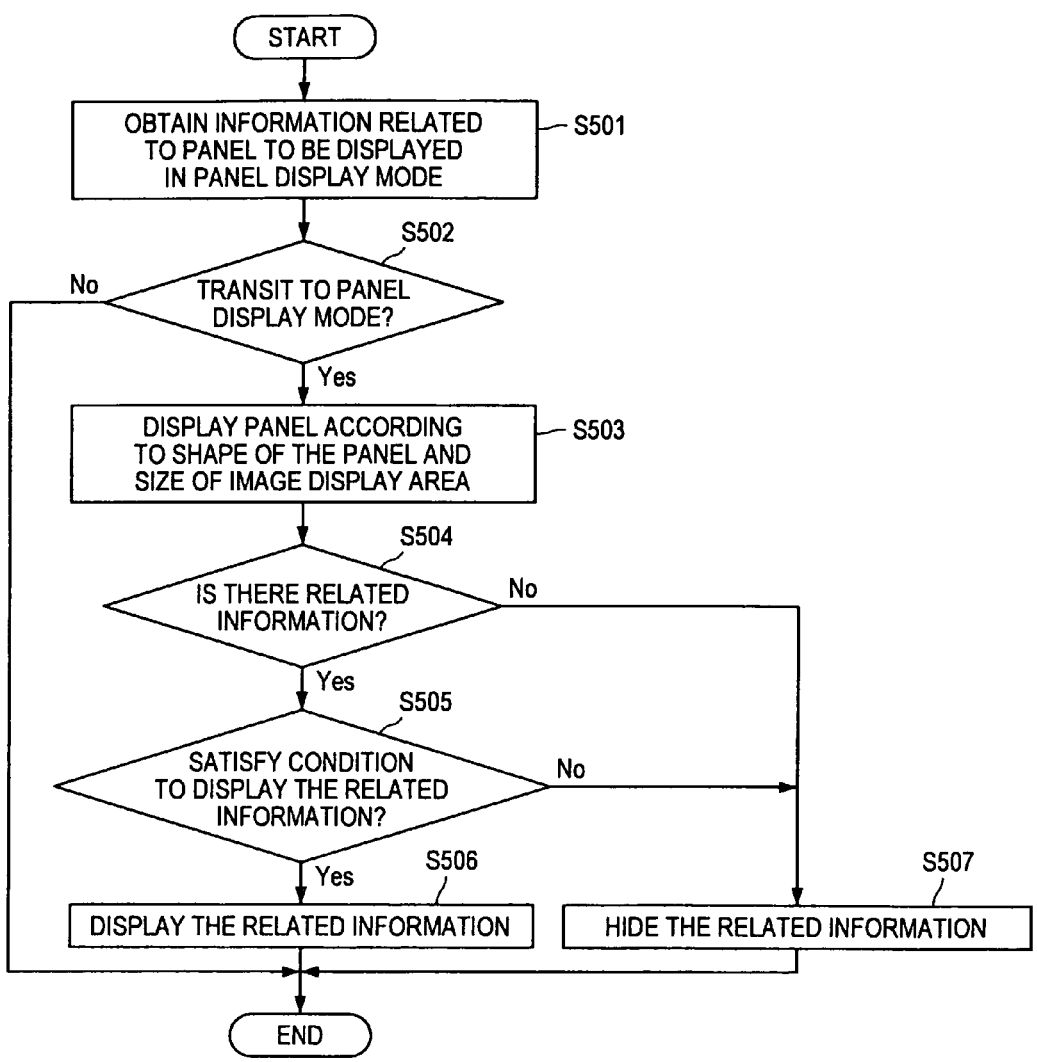
FIG. 27 is a flowchart showing a display operation of the panel display mode.

FIG. 27 is a flowchart showing a display operation of the panel display mode.

First, information related to a panel to be displayed in the panel display mode is obtained on the basis of data delivered by the provider which provides contents, and data accumulated in the display device 10 in advance (step S501). Thereafter, when the display mode transits to the panel display mode (step S502), the size of the panel is determined on the basis of the shape of the panel, the size of the image display area 302, and information amount of data to be displayed in the panel display area 312 or 314 and the panel is displayed on the screen (step S503).

At this time, it is determined whether or not there is related information such as data to be displayed in the related information display area 304 related to data to be displayed in the image display area 302, and data to be displayed in the panel information display area 320 related to data to be displayed in the panel display area 312 or 314 (step S504). Then, for example, as a request from the provider, a display condition such as whether or not the relationship between the content displayed in the image display area 302 on the screen 300 and the contents to be displayed in the panel display area 312 or 314 is considered (step S505).

For example, regarding the information to be displayed in the related information display area 304 and the panel information display area 320, only when there is no competitive relationship between the content displayed in the image display area 302 and the contents to be displayed in the panel display area 312 or 314, the panel display area 312 or 314 and the panel information display area 320 are displayed at the same time as the image display area 302 is displayed (step S506). On the contrary, when there is competitive relationship between the content displayed in the image display area 302 and the contents to be displayed in the panel display area 312 or 314, the panel display area 312 or 314 and the panel information display area 320 are not displayed at the same time as the image display area 302 is displayed (step S507).

There is a case in which the relationship between the content displayed in the image display area 302 on the screen 300 and the contents to be displayed in the panel display area 312 or 314 is not considered. In this case, regardless of the presence or absence of the competitive relationship, the panel display area 312 or 314 and the panel information display area 320 are typically displayed at the same time as the image display area 302 is displayed (step S506).

<5. Details of Recommendation Display Panel>

[Configuration of Recommendation Display Panel]

Figure 20:
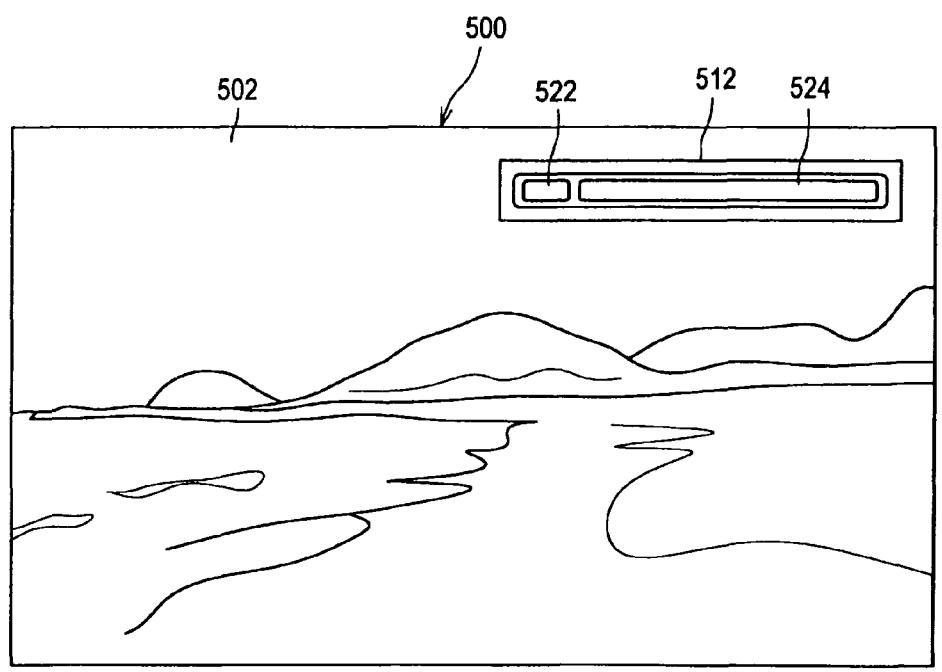
FIG. 20 is an illustration showing a screen 500 on which a recommendation display panel 512 is displayed.

FIGS. 20 and 21 are illustrations showing a screen 500 on which a recommendation display panel 512 or 514 is displayed. The recommendation display panel 512 or 514 is superimposed, for example, on the image display area 502 on the screen 500, and for example, displayed in the upper right portion of the image display area 502.

The recommendation display panels 512 and 514 display recommendation information for a user on the panel by referring to program information in the future, information provided by a provider, and the like on the basis of personal preference information estimated by the favorite view history collection algorism and personal preference information registered in the display device 10. For example, the recommendation display panels 512 and 514 shown in FIGS. 20 and 21 display information of contents recommended along with personal preference from information collected by the Internet. In particular, the recommendation display panel 512 shown in FIG. 20 displays new arrival information of the recommended contents. The recommended contents are, for example, a broadcast program, a widget (mini-application software), contents provided by a provider, and the like, which have not yet been obtained by the user. Also, the recommended contents are contents related to an external input device newly connected to the display device 10 and a content currently being viewed (for example, a program broadcast at the same time, a content in a similar genre, and the like).

An icon image 522 and text information 524 related to the recommended content are displayed on the recommendation display panel (first mode) 512. The icon image 522, the text information 524 related to the recommended content, a scroll bar 526, a thumbnail image 532, detailed information 534, and buttons 536 and 538 are displayed on the recommendation display panel (second mode) 514.

The icon image 522 is displayed for each recommendation information, and for example, has a shape as shown in FIGS. 8A to 8C representing to which display mode the display mode transits to display the recommendation information.

The shape of the icon image 522 is not limited to the shape shown in FIGS. 8A to 8C. The text information 524 related to the recommended content is a title of the recommendation information, a brief content of the recommendation information, and the like. The scroll bar 526 is displayed when there are many recommendation information items and they are difficult to display in the recommendation display panel 514. The thumbnail image 532 is an image related to the recommendation information whose detailed information is displayed. In the detailed information 534, detailed information of the item selected on the recommendation display panel 514 is displayed. The buttons 536 and 538 are, for example, a selection button, a registration button, or the like.

Each recommended content displayed on the recommendation display panel 514 can be moved by operating the up key or the down key on the remote control 600. The detailed information is displayed by pressing the "decision" button on the remote control 600.

[Operation Using Recommendation Display Panel]

Figure 28:
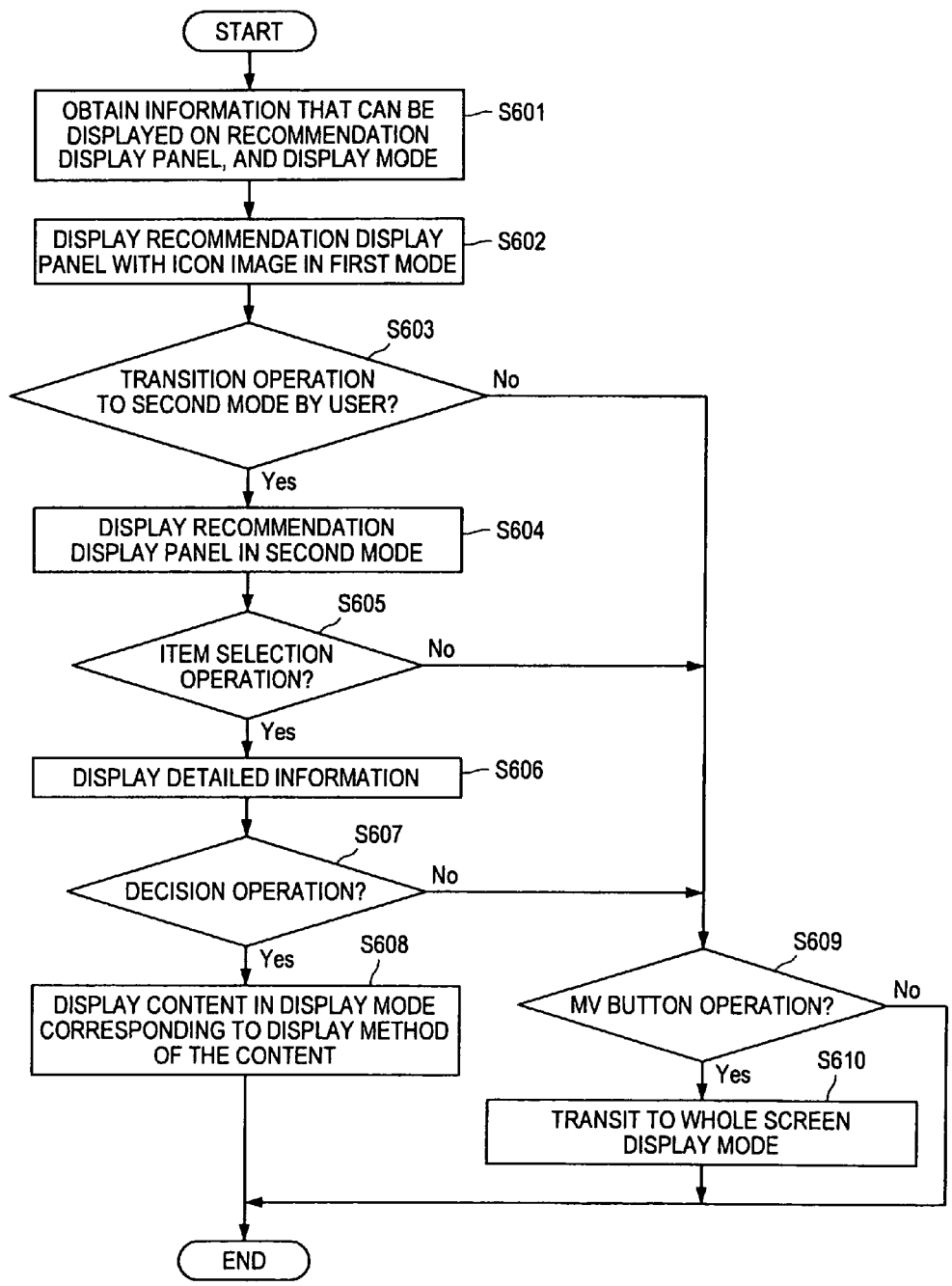
FIG. 28 is a flowchart showing an operation related to display of the recommendation display panel.

FIG. 28 is a flowchart showing an operation related to display of the recommendation display panel.

First, information that can be displayed on the recommendation display panels 512 and 514 is obtained. At this time, when the information that can be displayed is obtained, information related to the display mode which indicates to which display mode the display mode transits is also obtained (step S601).

When the information that can be displayed on the recommendation display panels 512 and 514 is newly obtained, the recommendation display panel 512 is displayed in the upper right portion of the screen 500 in the first mode. At this time, if the displayed information 524 is selected, the icon image 522 indicating to which display mode the display mode transits is also displayed (step S602). The information that can be displayed on the recommendation display panels 512 and 514 may be all information received by the display device 10, or may be limited to information according to personal preference information.

Next, it is determined whether or not a selecting operation by a user is performed by the remote control 600 so that the recommendation display panel 512 in the first mode transits to the recommendation display panel 514 displayed in the second mode (step S603). When the transition operation by the user is performed, the recommendation display panel 514 is displayed on the screen 500 (step S604).

Each recommended content displayed on the recommendation display panel 514 can be moved by operating the up key or the down key on the remote control 600. At this time, whether or not an item selecting operation is performed is determined (step S605). When the item selecting operation is performed, detailed information of the selected recommended content is displayed (step S606). Further, whether or not a decision operation to display the item for which the detailed information is displayed is performed is determined (step S607). When the decision operation is performed, the recommended content is displayed on the screen in a display mode corresponding to the display method of the recommended content (step S608). The user can predict in which mode the selected recommended content is displayed by referring to the icon image 522.

On the other hand, when an operation by the user is not performed in steps S603, S605, and S607, whether or not the "MV" button provided on the remote control 600 is operated is determined (step S609). When the "MV" button is pressed, the recommendation display panels 512 and 514 are hidden, and the display mode transits to the whole screen display mode (step S610). When the "MV" button is not operated, the recommendation display panels 512 and 514 are continuously displayed, or will be hidden after a predetermined time has elapsed.

[Detailed Information 534 of Recommendation Display Panel 514]

Content displayed in the detailed information 534 of the recommendation display panel 514 will be described.

In the detailed information 534, a logo name of the program, an icon of the external device, a channel name if it is a broadcast wave, a network service name, a program title, a start time and end time, a total time, and the like are displayed. When a connection device connected to the display device 10 or a newly connected external input device is detected, the name, manufacture name, symbol mark, and the like related to the connection device or the external input device are displayed. Further, when music data or image data such as a photograph is obtained by connecting to an external device, various information related to the music data or the image data is obtained from a network or the like, and the various information is also displayed at the same time.

The data obtained as data that can be displayed in the detailed information 534 can be displayed as related information, for example, in the related information display area 304 and the panel information display area 320 on the screen 300 of the panel display mode. Also, the data can be displayed as information related to the related information display area 232 or a thumbnail image on the screen 200 of the multiple content display mode. In other words, the data obtained as data that can be displayed in the detailed information 534 may be related to the main content displayed in the image display area, may be related to a thumbnail image, or may be related to a panel. As described above, newly obtained data can be utilized in various display forms, and can be used repeatedly.

The item selected by the user can be used when obtaining recommendation information next time by accumulating the item as personal preference information of the user, so that it is possible to easily provide further effective information for the user.

<6. Remote Control 600>

Figure 23:
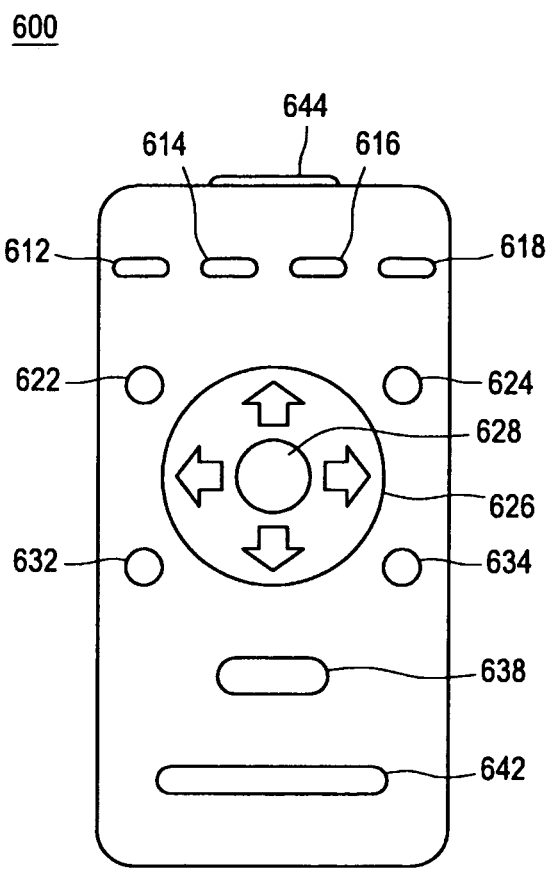
FIG. 23 is a front view showing the remote control 600 according to the embodiment.

FIG. 23 is a front view showing the remote control 600 according to the embodiment.

The remote control 600 includes, for example, a blue button 612, a red button 614, a green button 616, a yellow button 618, a widget/application button 622, a screen display button 624, a cross key 626, a decision button 628, a back button 632, an option button 634, an MV button 638, a HOME button 642, a trigger switch 634, and the like.

When the display mode transits from the whole screen display mode to the multiple content display mode, the display mode can be switched by pressing the MV button 638. When a display mode returns from the multiple content display mode, the panel display mode, or a screen on which the recommendation display panel is displayed to the whole screen display mode, also the display mode can be switched by pressing the MV button 638.

Information in the related information display area 232 displayed in the multiple content display mode can be switched between visible state and hidden state by an operation of the screen display button 624.

The blue button 612, the red button 614, the green button 616, and the yellow button 618 are buttons for selecting a program in the EPG (Electronic Program Guide) or the like.

As the trigger switch 644, a proximity sensor, an infrared blocking sensor, a push-button switch, or the like is used. The remote control 600 includes the angular velocity sensor 602 and the acceleration sensor 604, and the remote control 600 can display a cursor on the screen and move the cursor freely.

The remote control 600 can perform content selecting operation on a focused (highlighted) content by a cross key operation. Similarly, the remote control 600 can move and place a content by an operation to hold a finger over the trigger switch 644 or an operation to press the trigger switch 644, and a release operation after the move. Further, the remote control 600 can perform operations for pasting an image on the image display area, registering a content, and the like by the operation to hold a finger over the trigger switch 644 or the operation to press the trigger switch 644, and the release operation after the move.

When the operation to hold a finger over the trigger switch 644 or the operation to press the trigger switch 644 (state of ON) is performed, an image having been focused on the screen (for example, a thumbnail image or an item) is decided as a reference position. Information related to the position, velocity, and acceleration detected by the remote control 600 is used on the basis of the reference position. An object can be operated on the basis of the reference position. By this, the display device 10 and the remote control 600 do not need initial reference setting such as the size of the display screen, calibration according to the position in the display screen, and the like.

In this embodiment, the screen may return to the screen before the transition by an operation to swing the remote control 600 or an operation to move the cursor outside of the screen.

As shown in FIG. 16, when performing a moving operation of an object (widget image), if trying to place the object on the image display area 302, a moving image, a still image, or a photograph related to the selected object may be enlarged and displayed. For example, after the object is moved and placed, scaling of the object is performed by swinging the remote control 600 in the front-back direction or the depth direction. In this case, when swinging forward, the object is scaled up, and when swinging backward, the object is scaled down. Further, the enlargement ratio and the reduction ratio are changed depending on the acceleration of the swinging remote control 600.

When registering a content from the image display area to the panel display area, or on the contrary, when registering a content from the panel display area to the image display area, the registration is completed by only an operation to select a content and move the content to the destination by the remote control 600.

Although, in the past, the registration operation is performed by pressing the option button to display a menu and then performing a button operation, by the remote control 600 of the embodiment, a content can be registered in the moving destination by only an operation to select the content, move the content, and release the content. As described above, also in the rearrangement of the thumbnail display area 212, the thumbnail images can be freely arranged by the remote control 600.

[Operation Using Remote Control]

Figure 29:
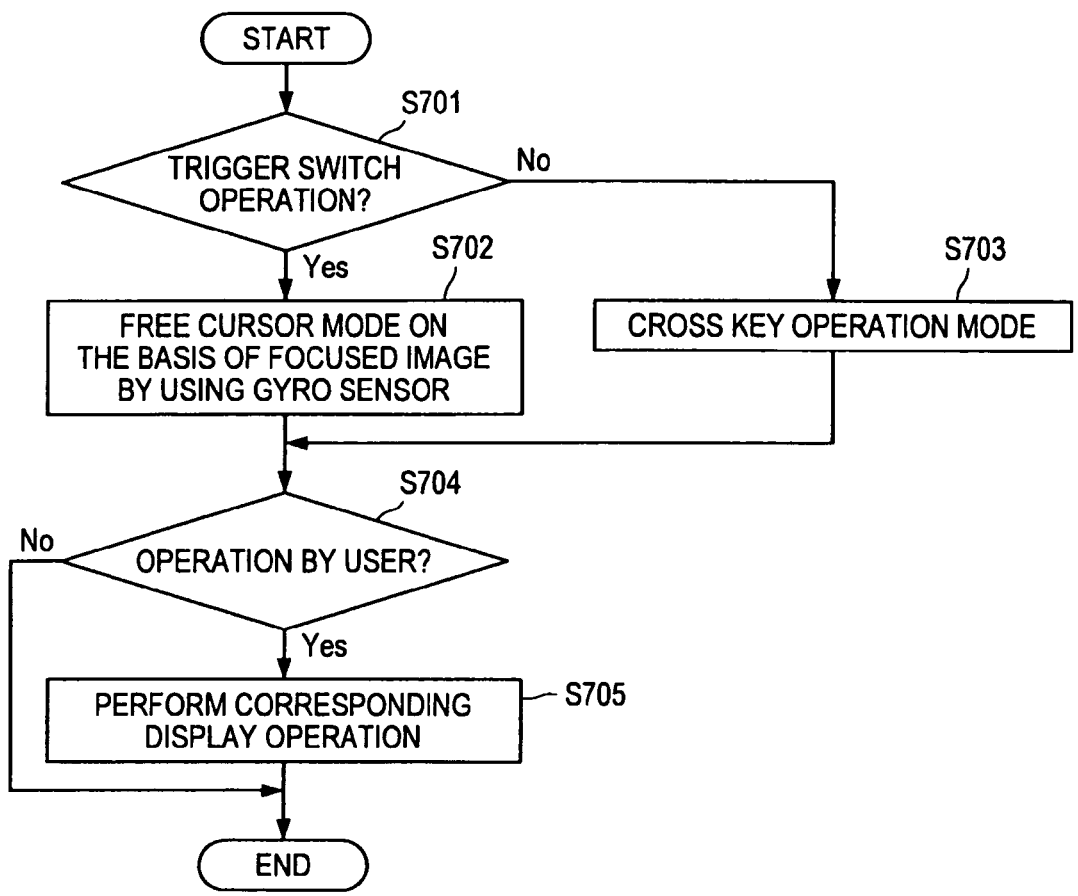
FIG. 29 is a flowchart showing an operation in which the remote control 600 is used.

FIG. 29 is a flowchart showing an operation in which the remote control 600 is used.

First, it is determined whether or not there is an operation to turn the trigger switch 644 on by an operation to hold a finger over the trigger switch 644 or an operation to press the trigger switch 644 (step S701). When there is no operation to hold a finger over the trigger switch 644 or an operation to press the trigger switch 644, an operation on the screen is performed by an operation using the cross key 626 (step S703).

On the other hand, when there is an operation to turn the trigger switch 644 on, the operation on the screen is performed in a free cursor mode on the basis of a focused image by using a gyro sensor such as the angular velocity sensor 602 or the acceleration sensor 604 (step S702).

When there is an operation by a user in a cross key mode or the free cursor mode (step S704), a display operation corresponding to the operation is performed (step S705). The display operation corresponding to the operation is, for example, the above described operations such as the selecting operation and the moving operation of the thumbnail image.

It should be understood by those skilled in the art that various modifications, combinations, sub-combinations and alterations may occur depending on design requirements and other factors insofar as they are within the scope of the appended claims or the equivalents thereof.

What is claimed is:

1. A display method comprising the steps of:
controlling, by a display mode controller, a screen transition to a whole screen display mode for displaying an image in an entire screen of a display section, a multiple content display mode for displaying, on the screen, a plurality of thumbnail images related to contents, or a panel display mode for displaying, on the screen, a panel on which information related to the contents is displayed;
determining, by a panel shape determination section, a shape of the panel based on the contents to be displayed on the panel;
displaying, on the screen, related information which relates to the contents to be displayed in the panel in the panel display mode; and
displaying the image on a part of the screen of the display section in the panel display mode,
wherein the panel information display section displays the related information on the screen based on a relationship between the contents to be displayed on the panel and the image to be displayed on the display section, such that only when there is no competitive relationship between the image and the contents to be displayed on the panel, the contents to be displayed on the panel and the related information are displayed at the same time as the image,
wherein a framing of the thumbnail images indicates the mode to which the display mode controller transitions when the at least one thumbnail is selected, the framing being selectable from a first framing indicating that the display mode controller transitions to the whole screen display mode when the at least one thumbnail is selected, a second framing indicating that the display mode controller transitions to the multiple content display mode when the at least one thumbnail is selected, and a third framing indicating that the display mode controller transitions to the panel display mode when the at least one thumbnail is selected.

* * * * *